US011909700B1

(12) United States Patent
Mansfield

(10) Patent No.: US 11,909,700 B1
(45) Date of Patent: Feb. 20, 2024

(54) ENTERPRISE MICRO-FORUM NETWORK

(71) Applicant: INNER-MACHINATIONS, L.L.C., Ponchatoula, LA (US)

(72) Inventor: Arpana Thakur Mansfield, Dublin, CA (US)

(73) Assignee: INNER-MACHINATIONS, L.L.C., Ponchatoula, LA (US)

(*) Notice: Subject to any disclaimer, the term of this patent is extended or adjusted under 35 U.S.C. 154(b) by 0 days.

(21) Appl. No.: 18/107,668

(22) Filed: Feb. 9, 2023

(51) Int. Cl.
*H04L 51/06* (2022.01)
*H04L 51/212* (2022.01)
*G06Q 50/00* (2012.01)

(52) U.S. Cl.
CPC ............. *H04L 51/06* (2013.01); *G06Q 50/01* (2013.01); *H04L 51/212* (2022.05)

(58) Field of Classification Search
CPC ........ H04L 51/06; H04L 51/212; G06Q 50/01
See application file for complete search history.

(56) References Cited

U.S. PATENT DOCUMENTS

| 7,764,952 B1* | 7/2010 | Sipher | H04M 3/42 |
| | | | 455/3.06 |
| 2020/0382463 A1* | 12/2020 | Garvey | H04L 51/226 |
| 2021/0288970 A1* | 9/2021 | Chawla | H04L 63/20 |
| 2022/0321513 A1* | 10/2022 | Lee | H04L 51/04 |

* cited by examiner

*Primary Examiner* — Michael A Keller
*Assistant Examiner* — Zonghua Du
(74) *Attorney, Agent, or Firm* — Sterne, Kessler, Goldstein & Fox P.L.L.C.

(57) ABSTRACT

Disclosed herein are system, method, and computer program product embodiments for an enterprise micro-forum network receiving a request message to subscribe to an originating node of a first enterprise micro-forum operative within an organization's enterprise micro-forum network configured with a first topic, wherein the first enterprise micro-forum is configured with one or more rules to at least process the request message to subscribe. The embodiment further operates by receiving a topic message to be transmitted to a subscriber recipient node within a second enterprise micro-forum operative within the enterprise micro-forum network. The topic message comprises modified content from the first topic and is transmitted based on transmission parameters for the originating node to transmit the topic message to the recipient node and acceptance parameters of the subscriber recipient node. The topic message is retained in the second topic of the subscriber recipient node.

19 Claims, 12 Drawing Sheets

ENTERPRISE MICRO-FORUM NETWORK

FIELD

This disclosure is generally directed to creation of enterprise content distribution constructs, and more particularly to enterprise topic-based forum structures.

BACKGROUND

There are many enterprise content dissemination products that have been operating for years. However, these products may be difficult to manage for larger distributed organizations where content may need to cross functional boundaries and the full impact of the content may not be uniformly understood by the entire organization. For example, it may be difficult for an originator of content to know what a proper distribution would look like, who the recipients may be and/or how to meaningfully convey the content. The inability of these products to address this type of content may often force the originator to simply blast the content to everyone on their organization's contact list hoping they capture everyone who may need to view or interact with the content. Unfortunately, the distribution of content indiscriminately may clutter some recipients' workspaces, making other more pertinent content more difficult to find; any content misunderstood by the recipient may not fulfill its intended purpose; and a pattern of irrelevant content may damage the reception of future content (e.g., seen as unimportant or junk). Alternatively, the originator may opt to distributed to an incomplete contact list or not at all, which may result in inadequate distribution and loss of proactivity and productivity.

SUMMARY

Provided herein are system, apparatus, device, method and/or computer program product embodiments, and/or combinations and sub-combinations thereof, for an enterprise micro-forum network. In some embodiments, the technology described herein provides for a machine-implemented non-hierarchical online enterprise broadcasting network controlled by an organization consisting of user-owned forums ("micro-forums") and subscribers (e.g., employees, members). Each enterprise micro-forum is an organization owned construct operative within the enterprise micro-forum network

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
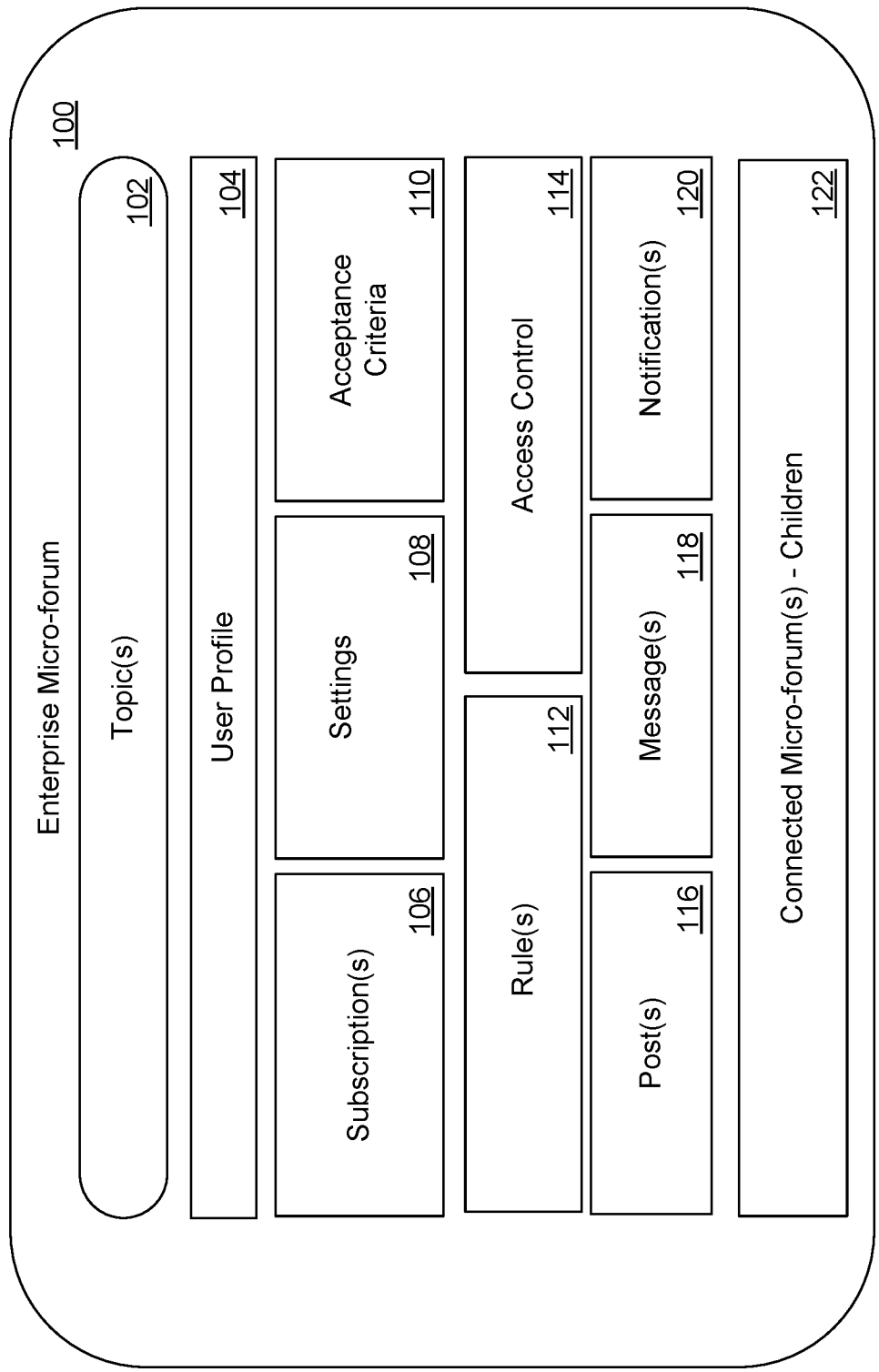
FIG. 1 is a diagram of an example micro-forum, according to some embodiments.

Provided herein are system, apparatus, device, method and/or computer program product embodiments, and/or combinations and sub-combinations thereof, for an enterprise micro-forum network. In some embodiments, the technology described herein provides for a machine-implemented non-hierarchical online enterprise broadcasting network controlled by an organization consisting of user-owned forums ("micro-forums") and subscribers.

In some embodiments, each micro-forum is controlled and maintained by its owners. Owners have real-time control of the forum topics, posted content and its life-time, validation rules for incoming and outgoing messages, organization of data and subscriber access rights. Owners may be companies, organizations, divisions, departments, executives, managers, members, planners, information technology (IT) staff, employees, contractors, to name a few. In some embodiments, the owner is multiple co-owners, such as all managers in a department, as an example. In some embodiments, the owner is not a person, but is a program, project, product, scheduling assistant, application, event, process, database, data stream, to name a few. As data or content within these micro-forums is updated or modified, downstream connected subscribers receive messages or notifications of these changes.

In some embodiments, the forum topics are not predefined or collaborated upon. Forum topics may be specifically created by the micro-forum owner to meet their needs within the organizational guidelines and terms of use. For example, a manager may create a micro-forum to push content to employees that they manage or an employee may create a micro-forum to collect change requests from clients. In another example, human resources (HR) may create a micro-forum to push content to all employees affected by HR issues.

In some embodiments, a forum topic serves the owners as a repository and collaboration space of related topic-specific content pertinent to its owners. The enterprise micro-forum may also be implemented as a gateway to regulate messages entering and exiting a micro-forum topic. As a gateway, the micro-forum topic enforces its owners' subscriptions, network terms of use and conditions, and its owners' acceptance criteria before accepting messages or notifications.

In some embodiments, an enterprise micro-forum may evaluate its owners' transmission requirements before allowing messages to be transmitting to its subscribers in the enterprise micro-forum network.

In some embodiments, an enterprise micro-forum can exist solely as a content repository and be accessible without any forum topics or any subscriptions or subscribers.

In some embodiments, dependencies and interdependencies of enterprise micro-forums and forum topics direct notifications and global messages to a target audience without utilizing any personal user data or user analytics.

Throughout the various descriptions, the phrase "enterprise micro-forum" may be interchanged with the phrase "micro-forum" without departing from the scope of the technology described herein. In addition, the terms "user" and "owner" may be interchangeable. And lastly, the terms "topic", "forum topic" and "topic node" may be interchangeable.

FIG. 1 is a block diagram of an enterprise micro-forum 100, according to some embodiments. Enterprise micro-forum 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

Enterprise micro-forum 100 shall be described with reference to FIG. 1. However, enterprise micro-forum 100 is not limited to this example embodiment.

Unlike conventional forums, an enterprise micro-forum 100, as described herein, refers to a private forum where an owner/user is the content creator or controller. The content created by an enterprise micro-forum is related to topics 102 arranged in nodes and may be managed as the primary enterprise micro-forum or may be defined by the user as one or more topic(s) 102 nodes and managed as child micro-forums by connected micro-forum(s) 122. The enterprise micro-forum is subsequently operative as part of a non-hierarchical network of interconnected micro-forum topic nodes. These topics 102 may be implemented as, but not limited to, plain text, Hypertext Markup Language (HTML), icons, video, audio, multi-media, software code, links, etc. These topics 102 are then made available to other micro-forum nodes on a subscription basis, where other enterprise micro-forum owners may request and receive an acceptance for subscription(s) 106 to connect their enterprise micro-forum to a specific topic node. Their subscription will form a trusted communication path from one or more of their enterprise micro-forum topic nodes to a subscribed to topic node. As additional users of other enterprise micro-forums subscribe, based on acceptance criteria 110, they will be interconnected to other enterprise micro-forums in a non-hierarchical enterprise micro-forum network structure (e.g., as shown in FIGS. 2-7). New or updated content added to a subscribed enterprise micro-forum topic will be transmitted along these one or more trusted communications paths to each subscriber of that topic, for example, as messages 118, based on the acceptance criteria 110 set for each subscribed and subscriber. Acceptance criteria 110 may include checks like, but is not limited to, "is user present on a white-list?", "is the user not present on a black-list?", "is the message sent from a subscriber?", "is the message from a specific topic?", "is a quantity of content created required for a user met?", "does a user have access rights as required?", "is a user pre-approved, does the user have an invitation?", "is the enterprise micro-forum accepting new subscriptions?", "is the user in good standing with the enterprise micro-forum?", "is a user rating requirement met?", "is a user currently blocked by the enterprise micro-forum?", "is the account creation age requirement met?", to name a few.

In a non-limiting example, an enterprise micro-forum is created by an IT department and the users are employee subscribers based on specific software or hardware configurations of their respective company computer devices. For example, as new software updates are made available, messages may be communicated to the subscribing employees impacted by the update advising them that software updates are available, or will be downloaded at a specific time (e.g., over the weekend), or the message itself may contain the update or one or more links to an update. Alternatively, or in addition to, similar notification messages about hardware changes may be implemented using the enterprise micro-forum platform as disclosed herein.

As will be described in greater detail hereafter, in some embodiments, these messages 118 may be new content, updated content or notices, such as, but not limited to, topic threads of company financials, benefit programs, training content, employee handbook, health policies (e.g., COVID procedures), visitor data, employee reviews, company social activities and events, to name a few. In some embodiments, the messages may include links to additional content. In a non-limiting example, the links may comprise attachments, executable software code, new applications (i.e., apps), software updates or notifications associated with software updates. However, in the sender/recipient relationship, the recipient (i.e., subscriber) ultimately controls whether a message reaches its destination. For example, the receiving micro-forum may establish their own rules that accept or prevent messages having keywords or subjects that indicate their own interests for this topic. In a non-limiting example, as a subscriber for Topic A, I am only interested in original content that is in a specific thread of a larger topic (e.g., specific theme (e.g., employee programs), geography (e.g., regional offices), demographic (e.g., new employees), product (e.g., sales information), model (e.g., new model announcements), event (e.g., employee gathering), etc.).

In some embodiments, an enterprise micro-forum 100 may be configured as a user page consisting of, but not limited to, forum topics 102 created by the user and further may include topic related data. In various enterprise scenarios, the user may be a manager, executive, department head, member, founder or other organizational structure, such as, office, department, division, subsidiary, parent company, contractors, committee to name a few. The topic related data may include, but is not limited to, a forum topic page, topic name, topic description(s), origination or created date, multiple levels of topic specificity or customization of the topic, to name a few. For example, the topic may be "employee benefits" with a focus on a specific benefit (e.g., health benefits). In addition, multiple levels of specificity may be included in the name or description or both. Alternatively, or in addition to, an enterprise micro-forum may be generated in an automated process, such as with AI, machine learning, deep learning, voice recognition, business process analytics, calendaring systems, or other known or future computer-based processing systems. In addition, original content, updated content, edited content, messaging, notifications, may be generated using automated processes. For example, if an IT department scheduled a software update, the calendaring software may generate and communicate a message reflecting the details.

User profile 104, may include user profile related data, such as department name, historical activity (such as list of topics that they have provided original content to, topics that they follow, etc.), logo, an image/photo, to name a few.

As previously described, content originated by the user of the enterprise micro-forum is provided for enterprise consumption as a topic 102 with a subscription 106 required to view/receive original content posts 106. In a non-limiting example, a subscriber may subscribe to an enterprise micro-forum based on a search of a user or owner name, micro-forum name, topic, keyword, or in response to a notice (e.g., email distribution), company provided listing, a current micro-forum's advertisement, or company/department circulations, to name a few. A subscriber may subsequently configure their own (or department's) enterprise micro-forum to have new content pushed to their enterprise micro-forum, for example, as messages to a topic. In some embodiments, the owner of the enterprise micro-forum may set-up rules 112 that apply acceptance criteria 110 for visiting users and subscribers, as well as, when transmitting or receiving content (e.g., messages) from another enterprise micro-forum. Rules 112 may include, but are not limited to, filtering content for specific keywords, topic, etc.; filtering users with specific ratings, employment titles, status, locations, departments, divisions, accounts, etc.; preventing messages from being forwarded or commented on; mark messages with a privacy level setting (such as, private or visible to specific users); redirecting messages to an external network or application (such as, a third-party social media site, another enterprise application, shared repository, email server, etc.); redirecting messages to specific topics; flagging messages with specific values or tags, etc. Rules may also be set by the network level to meeting terms and conditions set for all messages and users, such as, but not limited to, meeting specific moral, ethical or otherwise acceptable social conventions when creating a message or account, preventing unacceptable files from being uploaded to site, stopping abusive behavior, such as, rapid creation of messages by one user, attempting to circumvent another user's block, etc.

Settings 108 may include a collection of metadata based on any of the topic profile related data, user profile related data, device related data, interface related data (such as, but not limited to, colors, fonts, themes, images, etc.)

Access control 114 may include, but is not limited to, granting or denying access at the user, group, or role level; granting the ability to read, edit, delete, or add modifications (reply or comment) on content; granting ability to interact with an owner or other users (e.g., employees, contractors, etc.); each content provider and subscriber can manually or automatically engage rules preventing transmission or reception of content that they do not approve of (e.g., outside the intended topic).

Content originated by the user of the enterprise micro-forum 100 is provided for enterprise consumption as a topic 102 discussion board, with access control 114, to view posts 116 (content). Posts 116 may be, but are not limited to, text, embedded images, links to internet and media content, audio, video, code, software updates, executable files, etc. While, in most cases, posts 116 can be interchangeable with messages 118, a post may be committed to a discussion board, while not all messages received by an enterprise micro-forum will become a post on that micro-forum as some may be notifications. For example, an invitation to join an IT topic node may be pushed to a new employee as a notification, but would not be posted in the topic node as new content.

For subscribers of the enterprise micro-forum, with a subscription 106, a message 118 is communicated across a communication network each time an update is posted in the topic node or as an aggregated group of updates by time (e.g., each hour, day, etc.). The message(s) may include, but are not limited to, content to post (text, linked or embedded images, links to internet and media content, software, code, etc.), file attachments, and links to other content in the network (such as, messages and comments from other users or systems).

Enterprise micro-forum topic nodes are dynamic structures that act as relay points passing these messages 118 through the network, as well serving as a repository for these messages. In some embodiments, messages travel from topic node to topic node rather than from user to user. This allows messages to stay "on topic" and relevant as they pass through the enterprise micro-forum network.

In some embodiments, duplicate messages that take different routes through the enterprise micro-forum network are not posted to an enterprise micro-forum topic node that has previously received the same message. For example, a "Micro-forum B" may subscribe to "Topic A" located within an originating "Micro-forum A" directly or indirectly through another "Micro-forum C" that also subscribes to the original Micro-forum A. In this scenario, the same message may be delivered to Micro-forum B through multiple paths or micro-forums. However, in some embodiments, a later arriving duplicate message, sent on the multiple paths, is prevented from posting on Micro-forum B.

The enterprise micro-forums may communicate various message, status, and control or subscription information as Notifications 120. These notifications may include, but are not limited to, requests from another micro-forum user to be a subscriber, requests by subscribers to cancel a subscription 116, notice of an approved subscription request, notice of new messages being received from micro-forum subscribed to by the user, notice of new message received from an allowed user, notice of successful or unsuccessful message distributions to subscribers, notice of alerts and messages from the network or approved users, notice of changed impacting a rule, notice of subscription status changes 112, to name a few.

As enterprise micro-forums 100 are private spaces controlled by their respective owners (e.g., manually or by rules 112), the maintenance of the enterprise micro-forum and corresponding topic content is the responsibility of the users who best know and understand the topic. In some embodiments, remediation for unwanted content may include, but is not limited to, setting rules that may block or hide unwanted content. A list of enterprise micro-forums that the current enterprise micro-forum owns or has been granted owner rights to (i.e., co-owner) is instantiated as a listing of connected micro-forums 122 (children), including their micro-forum display information from settings (e.g., name, description, owner name, style, post template/type etc.), filtering and data-mining values from settings (e.g., micro-forum type, category, region, keywords, etc.), routing information from subscriptions and rules (e.g., subscribers, subscriptions, incoming rules, outgoing rules etc.), access rights (e.g., privacy level, co-owners, access control, etc.). For example, if a user had a topic called "HR" and wanted to include HR financial data. Instead of requiring the user to have to recreate the topic and lose their current topic history, the user can create a topic, for example, called "HR Information.", move "HR financial data" inside it and thereby create a new enterprise micro-forum for this content.

In some embodiments, messages broadcast to all subscribers may have variable lifespans or expirations depending on the value and continued relevancy of the content to the user, enterprise micro-forum and network, and may remain accessible for the earliest relevant time period specified, such as, but not limited to, a specific age of the message (in minutes, hours, days, weeks, months, or years), a date specified by the user or enterprise micro-forum, a specific retention period designated by the enterprise or the network, etc. It may be possible to override or ignore some expiration dates due to network terms of use. In a non-limiting example, a message regarding a company event may be set to expire after the event date by the user, after 30 days by the micro-forum, after 2 years by the enterprise micro-forum; resulting in the message expiring after whichever date comes first. In some embodiments, the network may require the 2-year retention period to supersede other lifespans; in which case, the event date set by the user and 30 days set by the enterprise micro-forum would be ignored.

Figure 2:
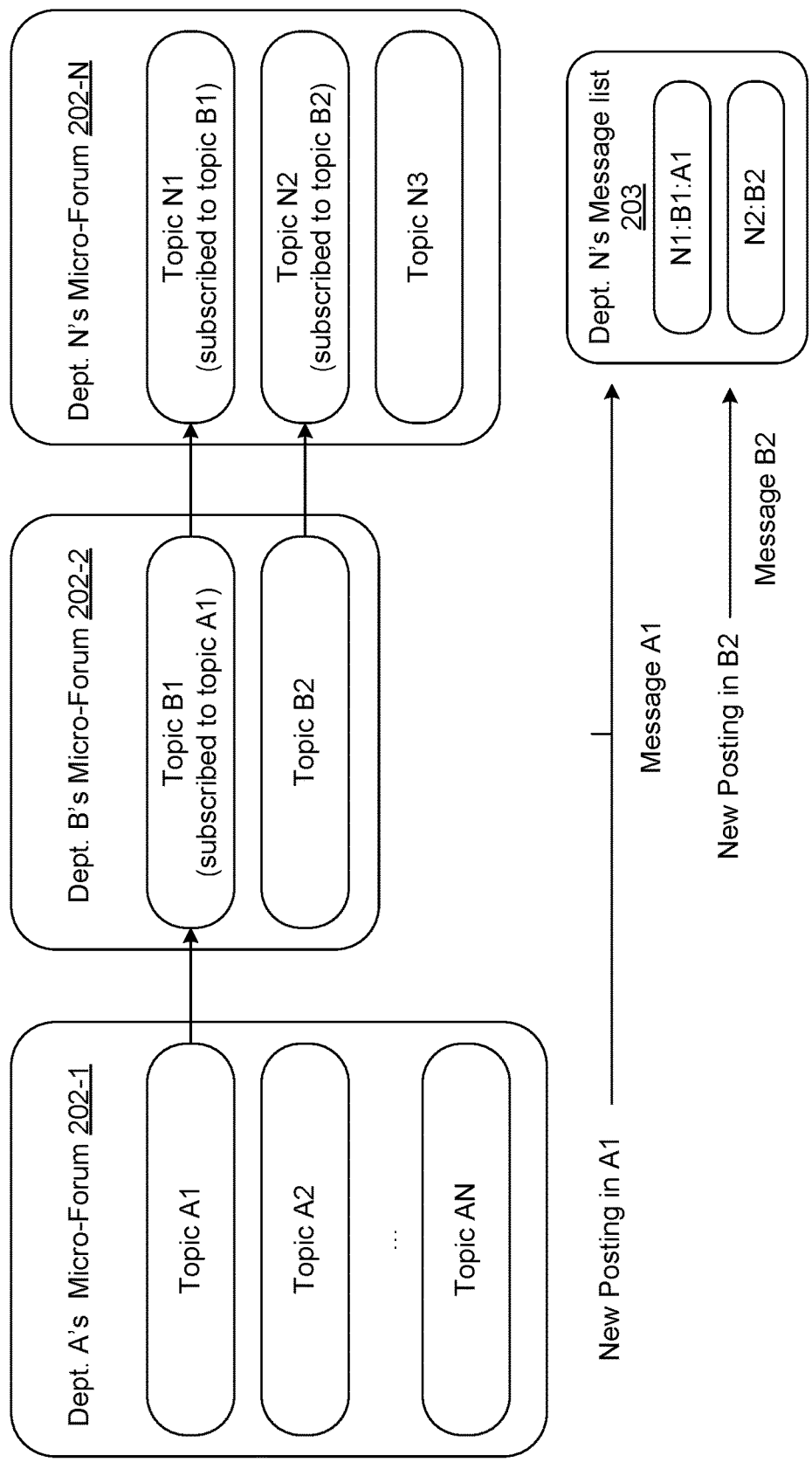
FIG. 2 is a diagram of an example micro-forum network, according to some embodiments.

FIG. 2 is a flowchart for an enterprise micro-forum network 200 (network), according to an embodiment. FIG. 2 may be performed by processing logic that can comprise hardware (e.g., circuitry, dedicated logic, programmable logic, microcode, etc.), software (e.g., instructions executing on a processing device), or a combination thereof. It is to be appreciated that not all steps shown may be needed to perform the disclosure provided herein. Further, some of the steps may be performed simultaneously, or in a different order than shown in FIG. 2, as will be understood by a person of ordinary skill in the art. In addition, enterprise micro-forum network 200 will be described at a high level to provide an overall understanding of flow of content of a micro-forum from topic node-to-node. Greater detail will be provided in the figures that follow.

In some embodiments, an enterprise micro-forum network 200 may be configured on one or more separate or interconnected computing devices. These computing devices may include, but are limited to, a server device, a plurality of interconnected server devices, a mobile device (e.g., smartphone, tablet, laptop, wearable device, etc.) or display devices, although other devices capable of processing data are contemplated without departing from the scope of the technology described herein. For example, enterprise micro-forum network 200 may be configured to include department interfaces for data entry/output. Data input department interfaces (UI) may render various graphical department interfaces, such as a data entry templates.

In a non-limiting example, a plurality of micro-forums 202(1-N) are interconnected based on subscriptions. This example embodiment will be described for departments, but any enterprise micro-forum owner entity may be substituted throughout without departing from the scope of the technology described herein.

As shown, Department A's micro-forum 202-1 may include topics that Department A is interested in or is responsible to post about (e.g., company or job requirements), such as Topics A1, A2 . . . AN. Department B operates their own enterprise micro-forum 202-2 that may also include topics that department B is interested in or responsible to post about. Department B may therefore subscribe to topics located within any other micro-forum (or within their own micro-forum). A subscription assumes that a subscribed to micro-forum accepts their subscription request and messages between their micro-forums adhere to the transmission rules of the respective micro-forums. For example, Department B's micro-forum 202-2 may have a Topic B1 that aligns with Topic A1, by same or similar topic names or descriptions, keywords, etc. or a relationship as determined by Department B. In this example, Department B subscribes Topic B1 from micro-forum 202-2 to Department A's micro-forum 202-1 Topic A1 so that they may follow that specific topic. As shown, Topic B1 will, upon creation of a successful subscription, receive any updates posted within Topic A1, as "Message A1". Department N may also be interested in a same or similar topic and therefore they subscribe their Topic N1 to Department B's micro-forum Topic B1. In this example, Department N also receives Topic A1 updates through their Topic B1 subscription. Also, in this arrangement, Department B's Microforum 202-2 acts as both a repository for Topic A1 posts as well as a relay to Department N's micro-forum 202-N, Topic N1. As such, Department N gains a benefit of Department A's posts without having to be aware that Department A's micro-forum 202-1 or Topic A1 even exists. Alternatively, or in addition to, Department N may also subscribe directly to one or more topics on Department A's micro-forum 202-1.

Department N's micro-forum 102-N, may simultaneously subscribe to separate or different topics provided by Department B, such as Topic B2. This subscription has a separate communication path than the first subscription from N1 to B1 and will receive updates from Topic B2 as "Messages B2". As this example reveals, the enterprise micro-forum is connected by topics, not by department. This structure reflects a fundamental difference from current communication channels that are "user" centric. For example, prior systems operate by a post from a first department (e.g., originator) and then subsequently build the forum by a series of posts by a plurality of employees or other departments. For these forums to keep content focused on the current topic requires one or more controllers of the forum to cull off-topic posts. As posts can accumulate very quickly, this becomes an arduous task performed at irregular time periods, or not at all. The technology as described herein eliminates this culling activity burden on the topic owner.

In some embodiments, a subscriber may offer potential content for the enterprise micro-forum topic that they subscribe to. For example, they may offer comments back to the owner of the micro-forum topic that they subscribe to. However, unlike the current systems described hereto before, it is up to the individual micro-forum owners, not a message board controller, to post or decline this content for the corresponding micro-forum topic or to edit existing content to at least partially reflect this potential content. In addition, as previously described, the owner of the micro-forum may set-up rules that dictate whether messages or content are sent, received, posted, updated or included as a modification to existing content.

In some embodiments, as previously described, a message may take unique and multiple routes between sender and recipient (e.g., between a manager and another employee). Successful routes represent a trusted chain of communication and a target audience for the message. Because topic nodes act as repositories for messages, failed routes may still be accessible by the potential recipient through searches, suggestions and other trusted chains. For example, Department N relies on Department B for Topic A1 updates, but could subscribe directly to Department A's micro-forum 202-1 or alternatively, to any other micro-forum that subscribes to Topic A1.

In some embodiments, an enterprise micro-forum network builds a communication routing structure between topic nodes which is mined for dependencies, exploration opportunities and change impact (for example, discovering hidden dependencies and relationships). Unlike conventional forums and person-to-person message boards, topic nodes, not users, are the focal points of how data is stored and interrelated; therefore, data mining does not require user information or usage history. For example, a data mining process can analyze Topic A1 "Employee Benefits" connections and discover Department N's Topic N1 "Insurance Benefits". Department N specializes in creating training materials for insurance programs. As a result of this analysis, Department A may create a new Topic A2 "Employee Benefits Training Materials" to reach out to Department N and Topic N1 subscribers to create unique benefits programs specifically designed for training purposes. This mining process does not require Department N's employee list or browsing history, but rather only needs to determine how Department N's interests align with Department A; the enterprise micro-forum already knows the commonality between the two departments (e.g., metadata, topic titles, topic descriptions, etc.).

In some embodiments, the micro-forum nodes may take different forms and functionality. In a non-limiting example, each micro-forum node may be a micro-forum implementing one or more topics, a micro-forum without topics (e.g., only functioning as a data repository/relay), or a micro-forum with no subscribers, limited to only receiving new content updates. Each micro-forum may be subsequently configured to include the functionality of any of these described configurations. For example, a micro-forum can add or remove one or more forum topics and each topic node may be subscribed to by one or more other micro-forums.

In some embodiments, departments may want to have a first topic that receives subscribed data only, while also maintaining a second related topic that also receives the subscribed data, but may also contains original content created by that department.

In some embodiments, departments may want to have a first topic that receives subscribed data from multiple other micro-forums. In this embodiment, a department subscribes a topic on their micro-forum to multiple other micro-forums. However, in some embodiments, a micro-forum department may also regulate, by rules, whether a downstream micro-forum may alter or edit the original content that they receive.

In some embodiments, interconnected topics are the same topic. In some embodiments, interconnected topics are similar topics. In some embodiments, interconnected topics are different topics that a department may desire to connect. Subscriber connected topic nodes gain the benefit of posted content from any upstream micro-forum nodes with newly posted content without even knowing that they exist. However, unlike other forums systems, the content posted at each micro-forum is controlled by each owner, without allowing another owner to hijack the topic. Additional controls include, but are not limited to, each content provider and subscriber can manually or automatically engage rules preventing transmission or reception of content that they do not approve of (e.g., outside the intended topic).

At least two technical improvements are provided by this structure. One, instead of building content by allowing anyone to post, followed by policing the content, each micro-forum can add to same or similar content, without unwanted superfluous content invading the topic space. Two, an owner of a subscription connected micro-forum can obtain aggregated related topic content without ever being aware of or interacting with the original source.

Another technical solution provided by the technology described herein is an ability to rapidly expand a network of enterprise micro-forums without structuring it as hierarchically dependent from the original source. For example, any micro-forum can connect, by subscription, to any micro-forum (with permission) and gain access to topics by direct or indirect connections to the original source. This loosely coupled network structure allows quick dissemination of topic-based original content along this ever-expanding network, while staying on topic and preventing someone from hijacking the original messaging. Another technical solution that prevents hijacking of content is based on the micro-forum subscriber controlling content changes to their topic by controlling whether messages are received by their topics based on their own rules. In other words, each micro-forum controls who receives their content and what content they receive.

In some embodiments, the messages may be delivered between nodes via a network and associated with a network-enabled data input program/application. The network may include one or more wired and/or wireless networks. For example, the network may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network and/or a combination of these or other types of networks.

Figure 3:
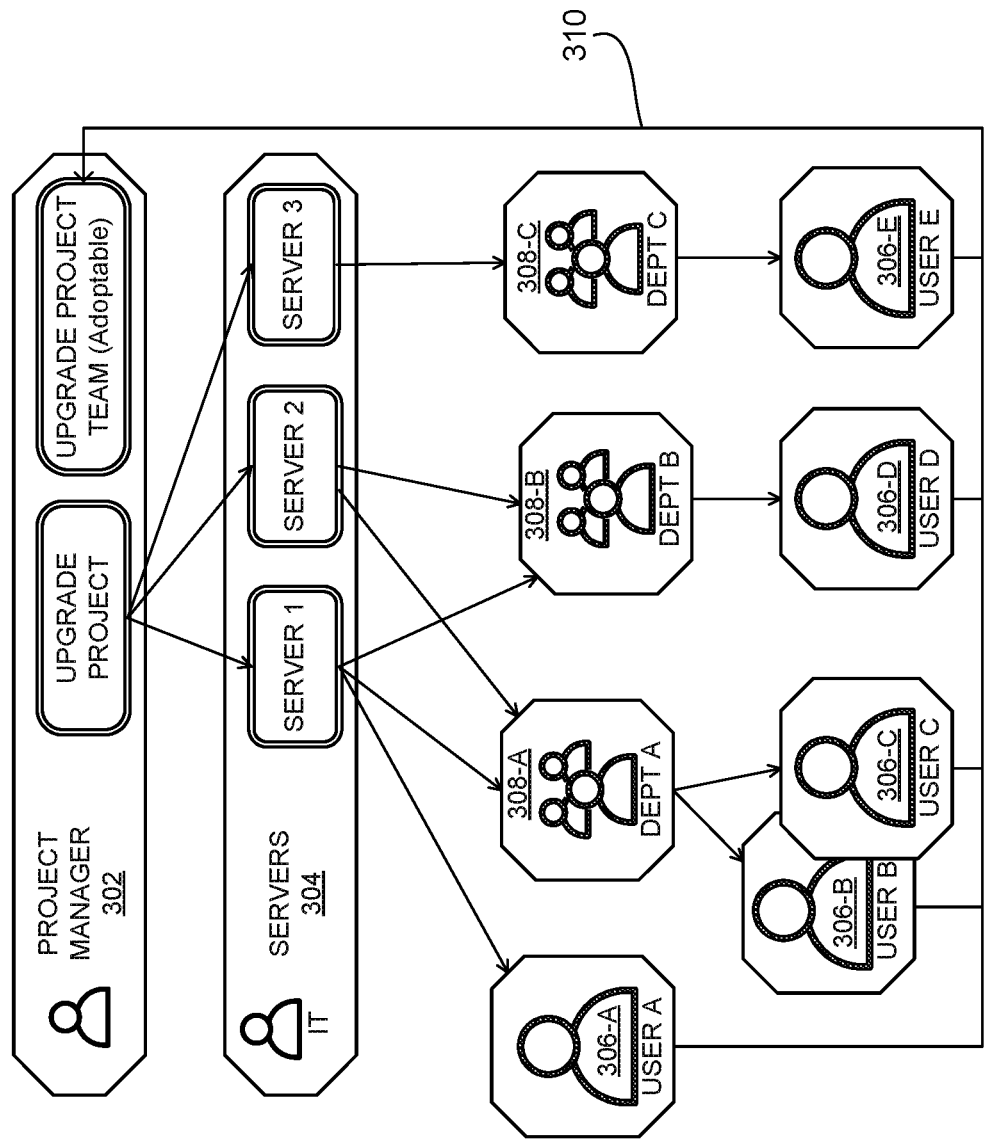
FIG. 3 is another example diagram of a micro-forum network, according to some embodiments.

FIG. 3 is a flowchart for a micro-forum network operation, according to an embodiment. It is to be appreciated that not all steps shown may be needed to perform the disclosure provided herein. Further, some of the steps may be performed simultaneously, or in a different order than shown in FIG. 3, as will be understood by a person of ordinary skill in the art.

FIG. 3 describes a scenario where the success of a project involves accurately understanding impacts of a change. In this enterprise micro-forum network, to be described in greater detail below, a Project Manager takes advantage of existing subscriptions to a Servers micro-forum 304 to communicate with interested or impacted users, sets up a micro-forum for future communication "Upgrade Project", and creates a collaborative space "Upgrade Project Team" without any laborious discovery process.

In a non-limiting example, a plurality of enterprise micro-forums are interconnected by topic node subscriptions so that a project manager may implement a project to upgrade, for example, hardware/software on any of Server 1, Server 2, or Server 3. Once one or more of these servers is updated, all users using these servers may need to test their applications and report any errors back to the project manager. In this example, if the IT department has not set servers to be adoptable, a project manager would have needed to get access to manually make a connection between an upgrade project, the servers and the users. Adoptable is defined as being able to share and/or post permissions. Therefore, in the past, this upgrade process was lengthy, difficult, and wasted resources. For example, instead of only targeting users that are connected to corresponding Servers 1-3, a blanket update may have been sent out to all users.

As shown, a Project Manager enterprise micro-forum 302 is setup by the project manager. Alternatively, or in addition, the Project Manager enterprise micro-forum 302 may be automatically generated based on a request from the project manager or other IT personnel or by a software wizard that guides the user. Within the Project Manager enterprise micro-forum 302, topic nodes, such as, "Upgrade Project" and "Upgrade Project Team (Adoptable)" are created. In some embodiments, the upgrade project topic node may send an invite (such as a link) to a second micro-forum, such as Servers enterprise micro-forum 304. The Servers 1-3 enterprise micro-forum 304 may establish a subscription based on the invite or may separately request to be a subscriber.

In some embodiments, the enterprise micro-forum networks may automatically discover dependencies between enterprise micro-forums. For example, a users' dependency may be discovered for any of Servers 1-3. Other dependencies may include, but are not limited to, applications hosted on the servers, as well as, systems dependent on these hosted applications, decommissioned applications, legacy applications, and small system applications, etc. These dependencies may be uncovered by metadata matching, keyword searches (e.g., a specific registry entry, software program, etc.). In some embodiments, pattern-matching and analytics tools (such a, artificial intelligence services, data analytics, data mining, etc.) may be used to assist in dependency discovery. For example, by providing recommendations for connections or searches based on percentage match. In some embodiments, the connections may be accomplished by contacting IT (direct message, email, etc.) requesting: Project Manager co-owner access to Servers, Server(s) set to "IsAdoptable" for "Project Manager" or everyone and the project manager can adopt (subscribe) individual servers to the "Upgrade Project" topic node manually. In these embodiments, regardless of how the subscriptions are instantiated, the process seeks to interconnect the "upgrade project" to the servers to be upgraded, departments and impacted users in an enterprise micro-forum network by subscription to allow inter-micro-forum messages and notifications to flow automatically.

Once a project manager can initiate sending messages to Servers 1-3, messages can flow to each user subscribed through topic nodes on User Micro-forums 306(A-E) or through their subscriptions to department topic nodes of Department micro-forums 308(A-C). These users may receive messages, including impacts, update links, executable code, etc., throughout the upgrade. Since the Project Manager's "Upgrade Project Team" is adoptable, any stakeholder can join and contribute to the team without asking the Project Manager for permission. That is, members of the team (e.g., users A-E) can automatically post their testing details back to the project manager micro-forum 302 topic node "upgrade Project Team (Adoptable).

This example embodiment demonstrates a technical improvement (trusted communication paths between platform components, computer devices, servers, apps or systems) to the computer system itself through enterprise micro-forum subscription-based interconnections.

Figure 4:
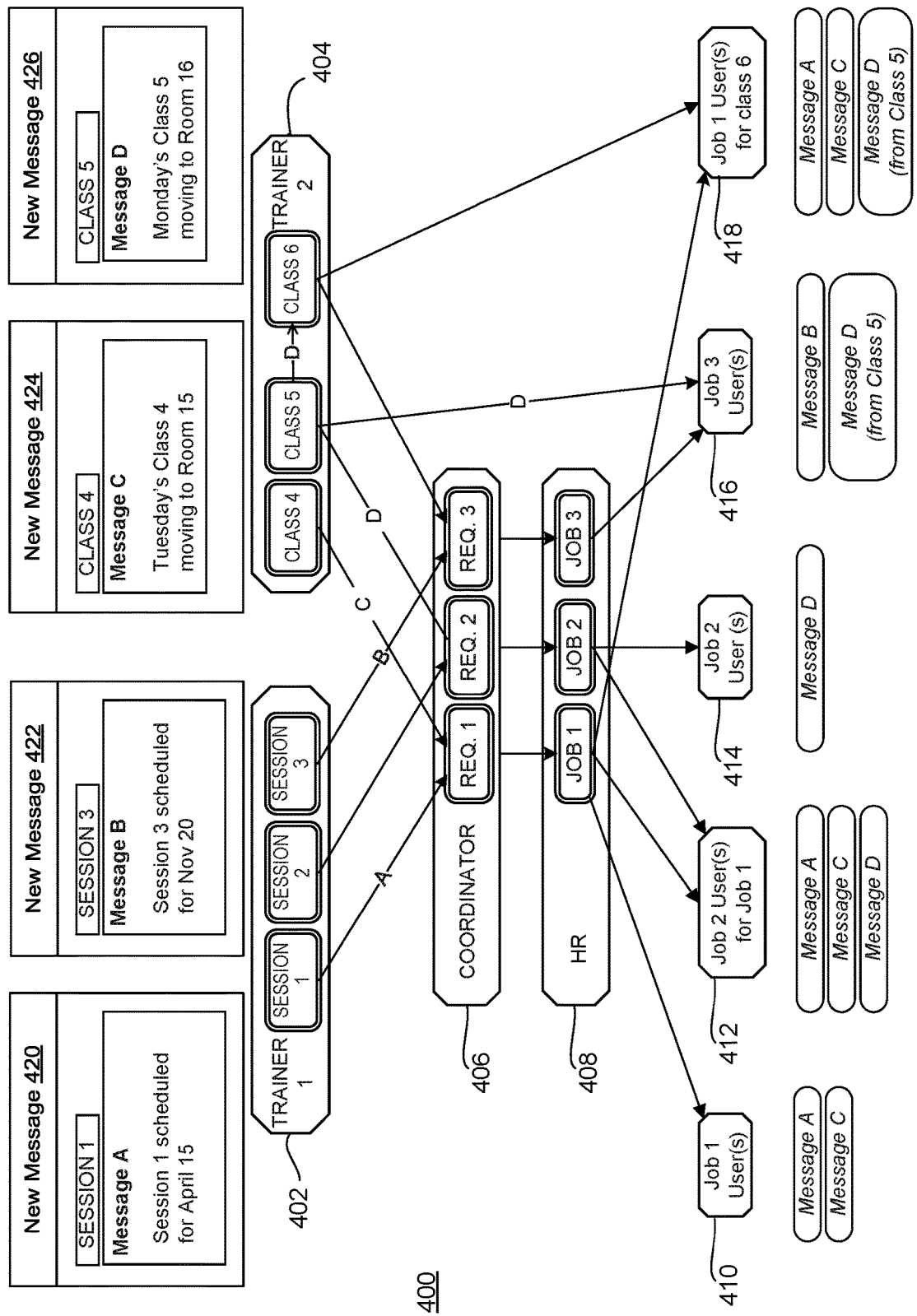
FIG. 4 is another example diagram of a micro-forum network, according to some embodiments.

FIG. 4 is a flowchart for an enterprise micro-forum network 400 operation, according to an embodiment. It is to be appreciated that not all steps shown may be needed to perform the disclosure provided herein. Further, some of the steps may be performed simultaneously, or in a different order than shown in FIG. 4, as will be understood by a person of ordinary skill in the art.

FIG. 4 represents a job training scenario where multiple distribution lists are required to communicate efficiently. However, the proximity, accessibility, sensitivity, and change frequency of the information may make compiling and maintaining these distribution lists cumbersome. For example, in FIG. 4, Trainer 1 (402) and Trainer 2 (404) would need to set up a process with HR to get the job requirements for each job seeker, regularly maintain and filter the data for each trainer, and create distribution lists in the communication system. In the past, by the time of creation, the distribution list may have already become out of date.

In some embodiments, the enterprise micro-forum network 400 in FIG. 4 shows micro-forums used to direct and redirect messages (e.g., New Messages 420 (Message A), 422 (Message B), 424 (Message C), 426 (Message D)), bridging the communication gaps, preserving privacy and eliminating the need for annoying distribution lists. Trainer 1 (402) and Trainer 2 (404) can communicate with relevant trainees 410, 412, 414, 416, and 418 without managing each trainees' job, job requirements, or contact information.

In a non-limiting example, a plurality of enterprise micro-forum are interconnected by topic node subscriptions so that a job training platform may automatically disseminate changes to training sessions and class schedules to downstream subscribing micro-forum nodes. While shown for session and class nodes and messages, any type of topic node, message or notification may be communicated along a trusted path to any subscriber in the job training platform. In this example, a Coordinator sets up one or more requirement nodes (REQ. 1-3) as "IsAdoptable" allowing trainers to make one or more trainer enterprise micro-forums 402 and 404 with training nodes joined to their corresponding requirements. Alternatively, a training coordinator micro-forum 406 subscribes one or more requirements nodes (REQ. 1-3) to one or more session or class nodes of corresponding trainer enterprise micro-forums 402 and 404. Regardless, of how the subscription is made, messages can now flow from training nodes to their corresponding requirement node(s). Human resources (HR) micro-forum 408 may subscribe one or more job nodes (Jobs 1-3) to the job coordinator's job requirement nodes (1-3). Job User(s) (e.g., job seekers) may setup their own micro-forums as subscriptions to one or more jobs (job topic nodes (1-3)) within HR micro-forum 408 that they are interested in.

As shown, Trainer 1 enterprise micro-forum 402 is setup by "Trainer 1" to include a plurality of training session topic nodes of sessions that they offer (e.g., "Sessions 1-3"). Trainer 2 enterprise micro-forum 404 is setup by "Trainer 2" to include a plurality of training class topic nodes (4-6) of classes that they offer. Each trainer sets up their micro-forums to meet their individual needs for organizing and holding training. Alternatively, or in addition, the Trainer 1 (402) and Trainer 2 (404) micro-forums may be automatically generated based on a training school's scheduling application (e.g., calendar app). The training "Coordinator" may generate a Coordinator micro-forum 406 with job requirement nodes "REQ. 1-3". Because the requirement nodes are "adoptable", a trainer may join "REQ. 1-3" nodes 406 using the Trainer 1 sessions 402 or Trainer 2 classes 404 that would satisfy the job requirements. The rights to join micro-forum 406 is controlled by the Coordinator and would require the training nodes to meet the metadata and/or rules set up by the Coordinator. Accordingly, each job node in the HR enterprise micro-forum 408 would subscribe to job requirements that would satisfy the job descriptions as provided by HR (e.g., a job positing) as provided by metadata and/or rules when the HR jobs nodes are setup.

Job seekers who may seek to apply for any of the jobs and associated training listed on the HR micro-forum nodes may establish their own individual enterprise micro-forum. A connection to the HR nodes will connect them to one or more topic nodes within the job training platform. Separately, they may connect directly to the training nodes that they have permissions or have an invite to subscribe to. Alternatively, or in addition to, the job seeker may automatically become a separate topic node for each job enterprise micro-forum (e.g., 410-418) that they apply to. For example, when applying for Job 1 (on HR micro-forum 408), a micro-forum with a node in their name, an ID, or a job application number may be automatically established for them. Also, while shown as separate job user micro-forums, each job seeker could be included in a single enterprise micro-forum with multiple job nodes setup based on aggregated user interests.

As shown, messages A ("Session 1 scheduled for April 15"), B ("Session 3 scheduled for November 20"), C ("Tuesday's Class 4 moving to Room 15") and D ("Monday Class 5 moving to Room 16") are each communicated though trusted communication paths (subscriptions) from the corresponding trainer nodes, to the corresponding coordinator nodes, to the corresponding HR nodes to the corresponding job user nodes. As shown, messages A and C are communicated from nodes Session 1 and Class 4 to REQ. 1 node, to job 1 node, to user nodes 410, 412 and 418. Message B is communicated from session 3 node to REQ. 3 node, to Job 3 node to User 416 (but to no one else). Message D may follow two differing paths from Class 5 node, REQ. 2 node to Job user nodes 412 and 414. Alternatively, or in addition to, as the enterprise micro-forum network is not hierarchical, Job User node 418 may subscribe directly class 6 node which subscribes to node class 5 within its own enterprise micro-forum (404). Message D is passed from Node Class 5 to Class 6 node to Job User node 418. In some embodiments, the job seeker may subscribe to many nodes that may receive the same messaging. In this scenario, the first message is received and posted to the subscribing micro-forum node and subsequent additional messages are ignored.

While not shown, any messages generated as original content by the Coordinator or HR enterprise micro-forums can also be communicated to the downstream subscribers as well. For example, if the job requirements change, the updates would be passed to downstream subscribing job nodes and subscribing Job User nodes.

In some embodiments, the enterprise micro-forum networks automatically discover dependencies between enterprise micro-forums (e.g., micro-forum of study sessions setup by fellow trainees, repository of various training-related certifications or renewal requirements, career advancement or mentoring opportunities for jobs, etc.). These dependencies may be uncovered by metadata matching, keyword searches (e.g., specific job descriptions, job titles, training session or class descriptions, etc.). In some embodiments, pattern-matching and analytics tools (such a, artificial intelligence services, data analytics, data mining, etc.) may be used to assist. Dependencies may also be automatically modified by other users or processes. For example, trainers may be automatically notified of new, changed, or deleted requirements by a system process; the coordinator may redirect incoming messages from depreciating requirements to new requirements or to additional requirements overlooked by the trainer, or the HR may change the requirements of jobs, to name a few. These changes may be seamless to trainers and job seekers, whose messages sources will be updated automatically.

In these embodiments, regardless of how the subscriptions are instantiated, the process seeks to interconnect the job seeker, HR department, training coordinator and trainers in an enterprise micro-forum network by subscription to allow inter-micro-forum node messages and notifications to flow automatically. Once a micro-forum is connected by subscription to a topic node, new messages posted to that topic node will be automatically communicated to downstream subscribers.

This example embodiment also demonstrates a technical improvement (trusted communication paths between platform components, computer devices, apps or systems) to the computer system itself through enterprise micro-forum subscription-based interconnections.

Figure 5:
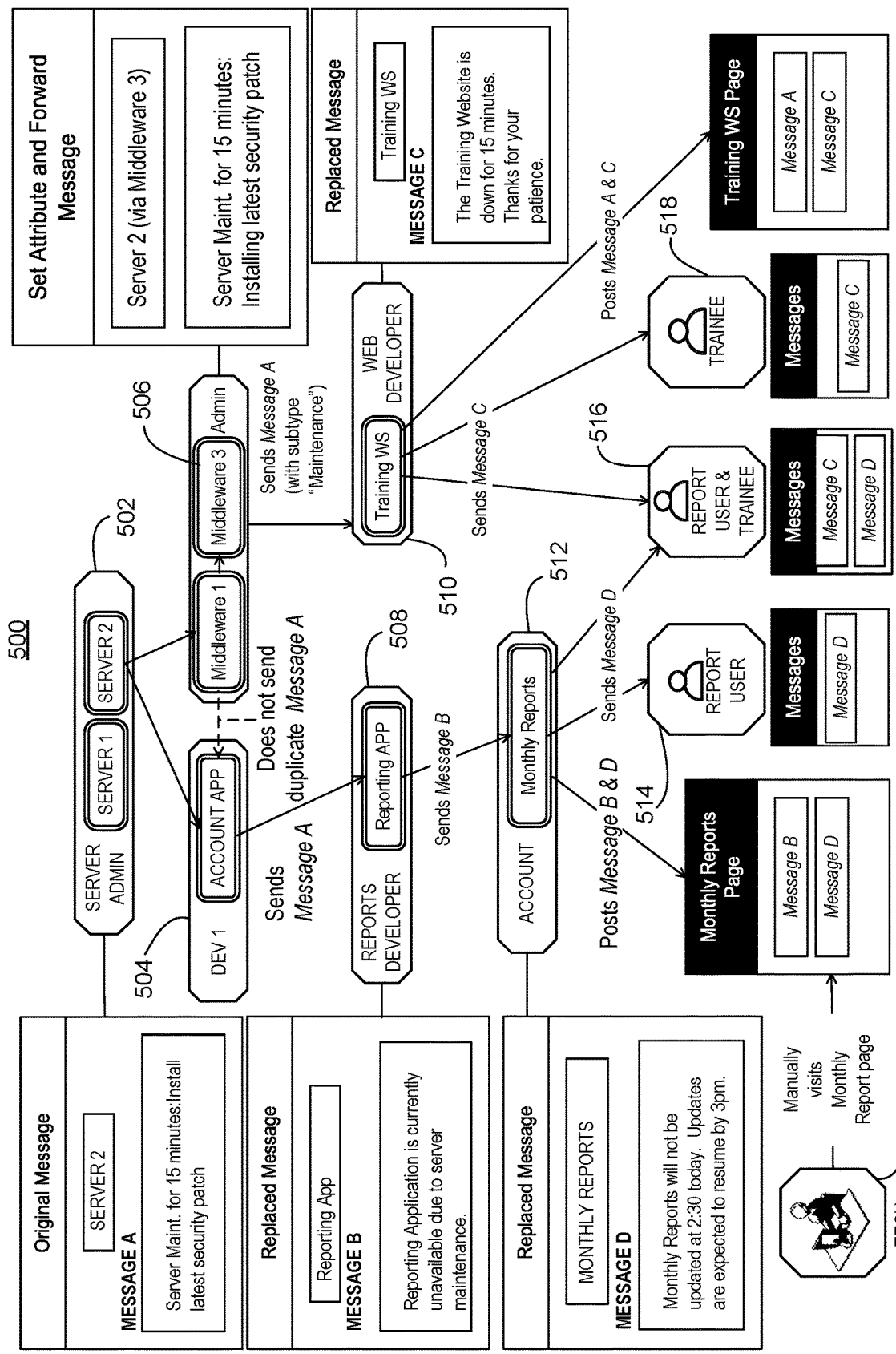
FIG. 5 is example flow diagram of a micro-forum network, according to some embodiments.

FIG. 5 is a flowchart for an enterprise micro-forum network 500 operation, according to an embodiment. It is to be appreciated that not all steps shown may be needed to perform the disclosure provided herein. Further, some of the steps may be performed simultaneously, or in a different order than shown in FIG. 5, as will be understood by a person of ordinary skill in the art. Each micro-forum 502-520 includes one or more topics that act as subscription-based enterprise network nodes. As shown in FIG. 5, each micro-forum may attempt to subscribe to any other node that is currently accepting subscribers. This embodiment discloses modification, such as, refining or focusing of messaging as it is communicated to differing downstream subscribing entities.

FIG. 5 highlights a common situation where a sender of the message does not know the audience or how to communicate in a meaningful way with the audience. Often these types of messages are sent as a network wide communication (e.g., a company-wide email). In this example, the enterprise micro-forum "Server Admin" 502 needs to relay maintenance information about a piece of hardware "Server 2". However, how the unavailability of "Server 2" impacting users is better understood by developers and administrators whose systems depend on it. The developers who own content in micro-forum "Account App" 504 may be unaware that an accountant relies on their application to produce their "Monthly Reports" and the accountant may not be aware of their dependence on "Server 2", resulting in a critical message from "Server Admin" 502 to the accountant owner of the micro-forum ACCOUNT 512 potentially being ignored and misunderstood.

The enterprise micro-forum network 500 in FIG. 5 shows how micro-forums may automatically or manual forwarded messages through multiple paths while they become further clarified along the way to reach the relevant recipients without requiring a network-wide communication to uninterested users. As a result, Message A originally sent as "Server maintenance for 15 minutes: Install latest security patch" for Server 2 arrives to a micro-forum REPORT USER 514 as "Monthly Reports will be delayed", a message more meaningful and efficient.

In a non-limiting example, a plurality of enterprise micro-forums are interconnected by topic node subscriptions so that a server maintenance platform may automatically disseminate maintenance updates to downstream subscribing enterprise micro-forum nodes. While shown for specific nodes and messages, any type of topic node, message or notification may be communicated along a trusted path to any subscriber in the service maintenance platform. In this example, a developer enterprise micro-forum DEV1 504 and admin enterprise micro-forum Admin 506 subscribe to "Server 2" node of a server admin enterprise micro-forum. Based on these subscriptions, Message A is automatically passed from "Server 2" node to "Account App" node and to "Middleware 1" node and then to "Middleware 3" node. While Message A may be relevant to these nodes, it may not be as relevant to downstream nodes. An enterprise micro-forum Reports Developer 508 receives Message A, but replaces this message with a more applicable targeted message to a subscriber "Monthly Reports" node within micro-forum Account (accountant) 512. As shown, Reports Developer updates Message A by posting a replacement message, Message B that indicates that "reporting application is currently unavailable due to server maintenance". This message (Message B) is communicated to downstream subscribing micro-forum node "Monthly Reports" and is subsequently retargeted by the micro-forum Account (accountant) 512 by replacement message D—"Monthly reports will not be updated at 2:30 today. Updates are expected to resume by 3 PM". This same retargeting process may occur for downstream messaging originating from the enterprise micro-forum Admin 506. As shown, Middleware 3 node sends Message A with a subtype notation of "maintenance". A downstream enterprise micro-forum subscriber node "Training WS (website)" Web Developer 510, upon receiving the modified Message A, replaces Message A with Message C—"The training Website is down for 15 minutes. Thank you for your patience." Message C is communicated to all downstream subscriber micro-forums, such as Report User and Trainee 516 and Trainee 518. Also, since micro-forum 516 also subscribes to "Monthly Reports" node within micro-forum 512, it will also receive replacement Message D.

In some embodiments, subscribed micro-forums, such as Tech Support 520, may have reception rules that do not allow messages to automatically be stored upon their arrival to its subscribed node(s). In this scenario, the Tech Support may initiate a manual visit of the "Monthly Reports" node from time to time, so as to not be overwhelmed with every message in real-time.

In these embodiments, regardless of how the subscriptions are instantiated, the process seeks to communicate the server maintenance information in its various forms along a trusted path of subscribers in an enterprise micro-forum network. Once a micro-forum is connected by subscription to a topic node, new messages posted to that topic node will be automatically communicated to downstream subscribers.

This example embodiment also demonstrates a technical improvement (applicable message modification along a trusted communication paths) to the computer system itself through enterprise micro-forum subscription-based interconnections and node-level message modifications.

Figure 6:
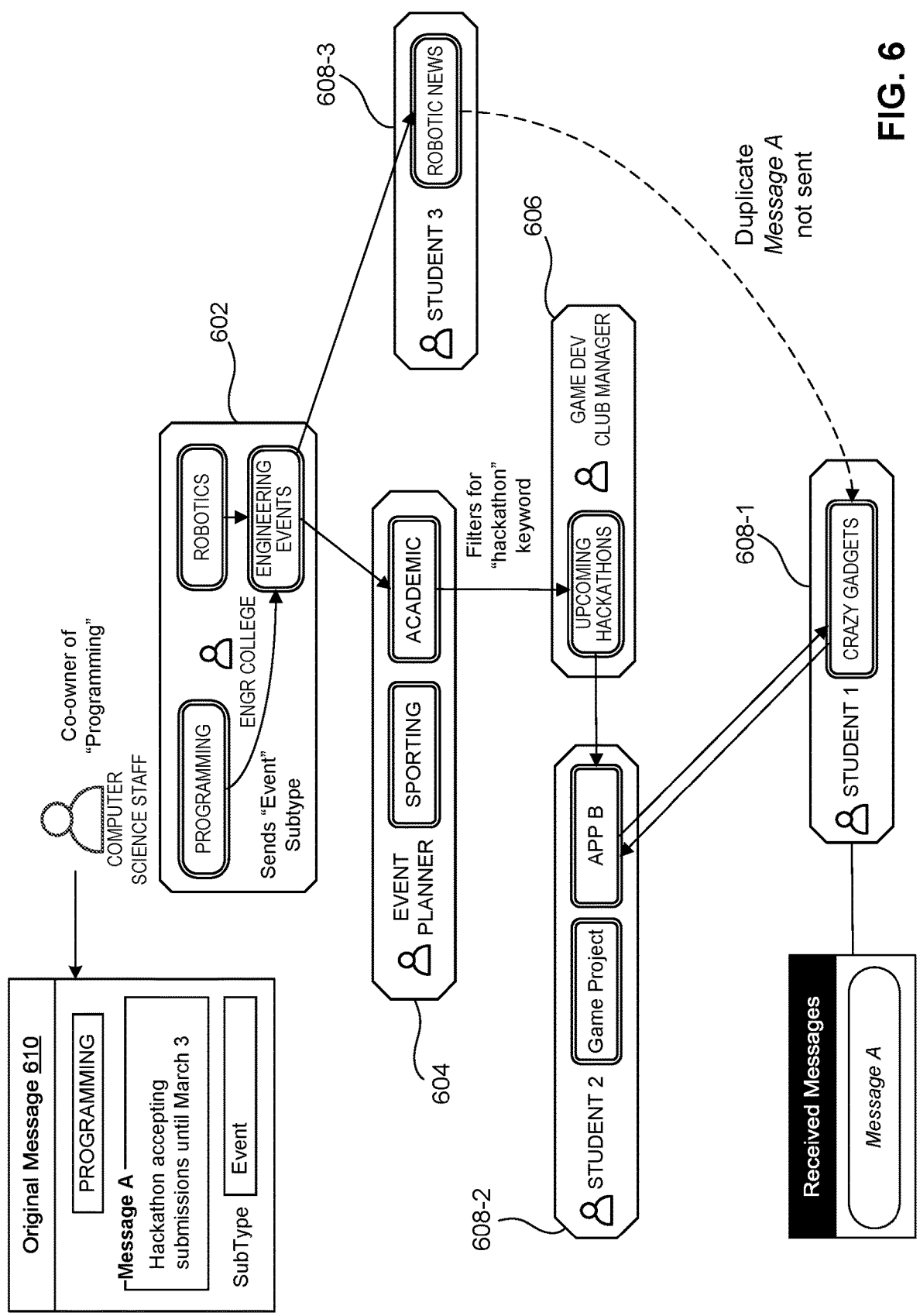
FIG. 6 is another example flow diagram of a micro-forum network, according to some embodiments.

FIG. 6 is a flowchart for an enterprise micro-forum network 600 operation, according to an embodiment. It is to be appreciated that not all steps shown may be needed to perform the disclosure provided herein. Further, some of the steps may be performed simultaneously, or in a different order than shown in FIG. 6, as will be understood by a person of ordinary skill in the art.

FIG. 6 shows a diverse organization, in this case a university, wanting to engage with their students, even the most reclusive. "Student 1" is a quiet student who only shares their interest of "Crazy Gadgets" with their close friends "Student 2" and "Student 3". In this figure, the "Hackathon" message from "Computer Science Staff" passes through more general (such as "Engineering Events" and "Academic") and more specific micro-forums (such as "Upcoming Hackathons") getting filtered and categorized and penultimately to a trusted source and ultimately to "Student 1", as will be described in greater detail hereafter. The message reaching "Student 1" is relevant to their "Crazy Gadgets" interest and respects their communication preferences. Furthermore, the "Computer Science Staff" processes (e.g., sending a global survey, reaching out to related clubs or groups, etc.) remain unchanged to engage "Student 1". This will also be described in greater detail below.

In a non-limiting example, a plurality of enterprise micro-forums are interconnected by topic node subscriptions so that an engineering college may host a hackathon event. In this embodiment, various ways that subscribers may receive the same message are illustrated. This scenario also illustrates the non-hierarchical nature of an enterprise micro-forum network as well as micro-forum owners may be multiple co-owners (e.g., computer science staff). This enterprise micro-forum platform may automatically disseminate information about upcoming events to downstream subscribing enterprise micro-forum nodes in a variety of differing paths. While shown for engineering, event planning, game development manager and student nodes and messages, any type of topic node, message or notification may be communicated along a trusted path to any subscriber in the engineering platform.

Figure 7:
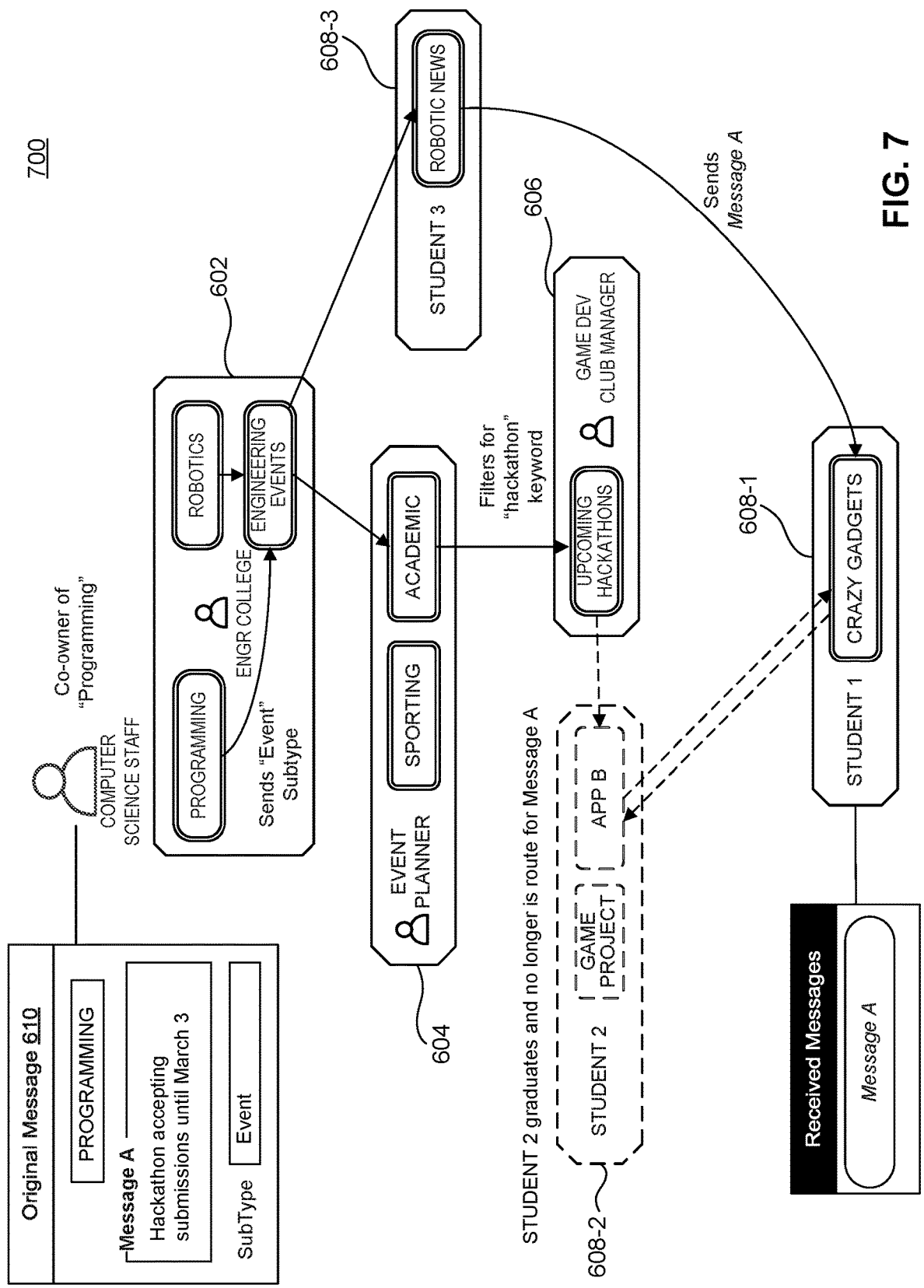
FIG. 7 is another example flow diagram of micro-forum network, according to some embodiments.

In this example, an event planner micro-forum 604 subscribes an academic node to one or more nodes within an engineering college micro-forum 602. Game development club manager micro-forum 606 may generate and subscribe an upcoming hackathon node to the Event Planner's micro-forum academic node. Students may subsequently setup their own micro-forums 608 (1-3) as subscriptions to one or more nodes within the engineering college platform. In this embodiment, the student 1 (Micro-forum 608-1) may receive original message "Message A" (610), that a "Hackathon is accepting submissions until March 3", in a variety of trusted communication paths. The message will be stored in their subscriber node entitled "crazy gadgets" with a follow-up notification that a message has been received. In a first path, message 610 may be generated by a computer science staff and posted on the engineering college micro-forum in a node entitled "programming". Another node within the same micro-forum, "engineering events", receives the message as a downstream subscriber and passes this message to all downstream subscribers. In this case, a subscribing node "Academic" within Event Planner micro-forum 604 receives the message and passes it to subscribing node "upcoming hackathons" within micro-forum Game Development Club Manager 606. Student 2 micro-forum 608-2 subscribes their APP B node to the "upcoming hackathons" node and subsequently receives the message 610. And finally, Student 1 micro-forum node "crazy gadgets" subscribes to the "APP Node" from Student 2 micro-forum 608-2. In operation, the micro-forum network will send copies of the original message to all downstream subscribers. However, in this embodiment, Student 1 is also interested in "robotic news" from Student 3's micro-forum 608-3 and therefore subscribes to that node as well. In this scenario, the "Robotic News" node also is a subscriber to the "Engineering Events" node of micro-forum 602 and will also receive a copy of message 610. However, this represents a duplicate message and therefore the micro-forum network will not send this message from Student 3 to Student 1. Alternatively, or in addition to, rules implemented on Student 1's micro-forum may ignore duplicate messages. FIG. 7 represents a variation of FIG. 6 where engineering micro-forum 700 subscriber Student 2 graduates and is no longer a trusted subscription-based route for messages. In this scenario, message 610 will be communicated to Student 1 (608-1) through Student 3 (608-3), i.e., "robotic News" node to "Crazy Gadgets" node.

While not shown, any messages generated as original content by the any of the enterprise micro-forums can also be communicated to the downstream subscribers. For example, if the Game Developer Club manager adds another category of games, they may invite downstream subscribers to subscribe to the new node.

In some embodiments, the enterprise micro-forum networks automatically discover dependencies between enterprise micro-forums (e.g., similar clubs that may benefit from merging or collaborating, shared interests among classmates, study sessions related to a specific course, etc.). These dependencies may be uncovered by metadata matching, keyword searches (e.g., specific event descriptions, colleges on campus, subjects and areas of interests, etc.). In some embodiments, pattern-matching and analytics tools such a, artificial intelligence services, data analytics, data mining, etc. to assist in dependency discovery (e.g., popularity of clubs among the students, gauge interest in new technologies or courses, etc.). Dependencies may also be automatically modified by other users or processes. For examples, as courses are phased out, students may be directed to their replacements; graduating students may transfer their forum ownership; and smaller clubs may collaborate in a larger micro-forum, to name a few.

In these embodiments, regardless of how the subscriptions are instantiated, the process seeks to interconnect the engineering college, events and students in an enterprise micro-forum network by subscription to allow inter-micro-forum messages and notifications to flow automatically. Once a micro-forum is connected by subscription to a topic node, new messages posted to that topic node will be communicated to downstream subscribers.

This example embodiment also demonstrates a technical improvement (trusted communication paths between platform components, computer devices, apps or systems) to the computer system itself through enterprise micro-forum subscription-based interconnections.

Figure 8:
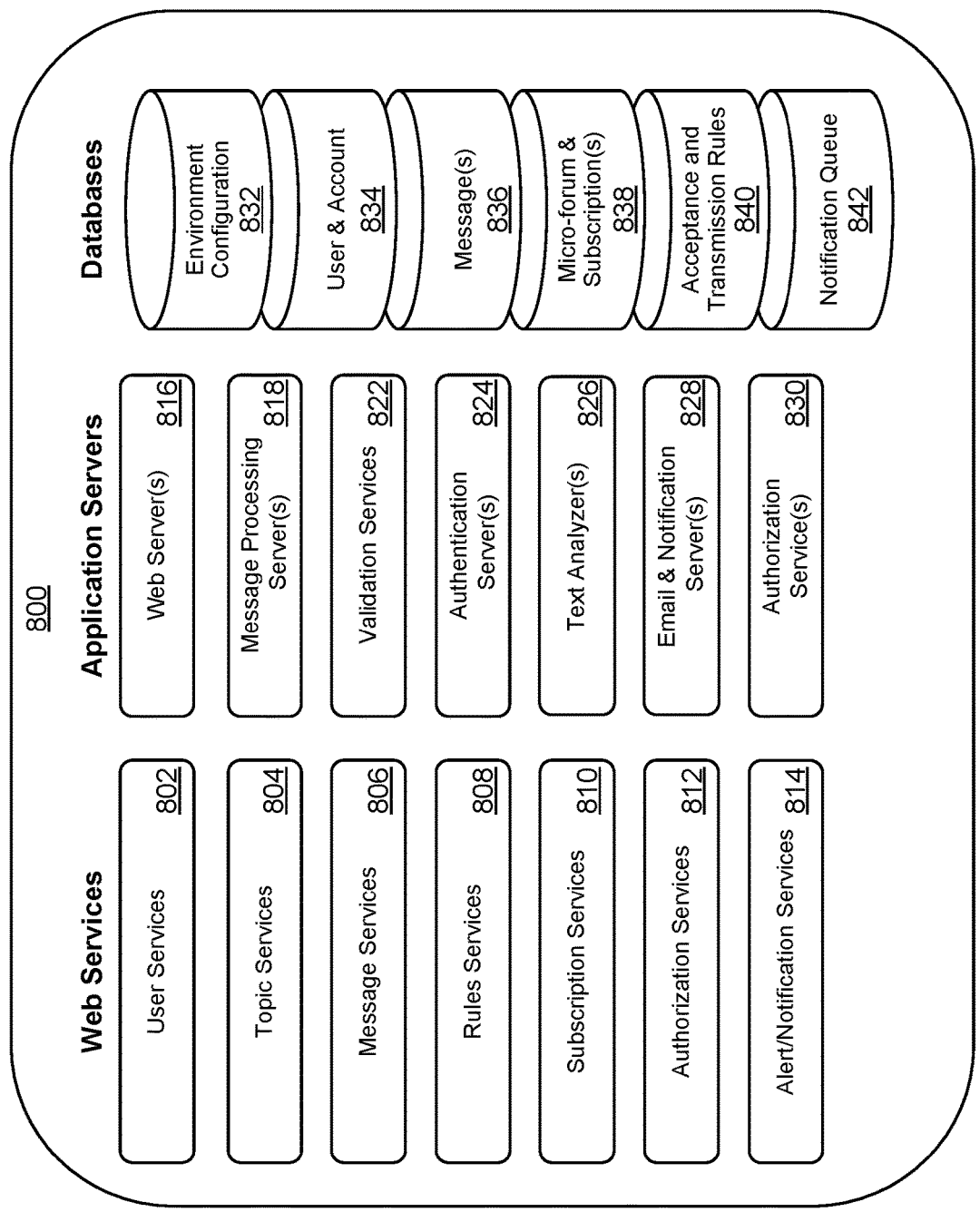
FIG. 8 is an example diagram of a micro-forum platform, according to some embodiments.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

For illustrative purposes, the diagram shown in FIG. 8, may be based on a micro-forum product architecture 800. In this non-limiting embodiment, an example Web-based micro-forum services platform is shown and described. However, one skilled in the art will appreciate that other hardware or software platforms, services, servers, tasks, objects, storage designations and subscription measures may be substituted herein without departing from the scope herein.

Web services commonly provide an object-oriented Web-based interface to a database server, utilized for example by another Web server, or by a mobile app, that provides a user interface to the end-user. Many organizations that provide data in formatted HyperText Markup Language (HTML) pages will also provide that data on their server as an Extensible Markup Language (XML) for storing, transmitting, and reconstructing arbitrary data. It defines a set of rules for encoding documents in a format that is both human-readable and machine-readable. In some embodiments, the Web services will be implemented as a collection of micro-services. A micro-service architecture is an architectural pattern that arranges an application as a collection of loosely-coupled, fine-grained services, communicating through lightweight protocols.

Example Web services will be described in greater detail below, but do not include all Web services available to a micro-forum platform. One skilled in the art will appreciate that additional Web services may be added to the micro-forum product architecture 800 without departing from the scope herein. User services 802 include, but are not limited to, a user account, user identifier, username (or user name), user profile, etc. Topic services 804 include, but are not limited to, a listing of topics, topic descriptions, topic keywords, topic filters, etc. Message services 806 include, but are not limited to, communication services between topic nodes, delivery confirmations, and delivery failure retry cycles, etc. Message services 806 may also include separate services, such as, but not limited to, "Performance" services that include, but are not limited to, compression of uploaded images, pre-caching of frequently visited micro-forums, "Rules Processing" services that include, but are not limited to, processing of rules; creation and modification of computer-generated data required during the rules processing (such as, automated messages, automated subscriptions, user account status changes, etc.) and "Analytics" services that include, but not limited to, analyzing message content for adherence to rules; providing subscription recommendations; providing analysis required for rules processing, reporting and querying; artificial intelligence analysis services; image analysis required for uploaded images.

Rules services 808 include, but are not limited to, rule templates to assist a user in developing their micro-forum rules sets, rule editors for rule changes or updates, rule enforcement, rule conflict determinations, etc. Subscription services 810 include, but are not limited to, processing of subscription requests, tracking current subscriptions, detection of subscription errors or of subscriber's failure to adhere to subscription rules, etc. Authorization services 812 include, but are not limited to, security between micro-forum nodes, evaluation of micro-forum identification parameters, and detection of unauthorized attempts to alter micro-forum structure, content or data. Alert/Notification services 814 include, but are not limited to, alert or notification messaging between micro-forum nodes. These alerts may be notifications that new content (e.g., messages) have been downloaded to a topic node, a request for subscription has been received, accepted or denied, etc.

Example application servers will be described in greater detail below, but do not include all application servers available to a micro-forum platform. One skilled in the art will appreciate that additional application servers may be added to the micro-forum product architecture 800 without departing from the scope herein. A Web server 816 consumes several Web services at different machines and compiles the content. A Web server 816 is computer software and underlying hardware that accepts requests via HTTP (the network protocol created to distribute web content) or its secure variant HTTPS. A user agent, commonly a web browser or web crawler, initiates communication by making a request for a web page or other resource using HTTP, and the server responds with the content of that resource or an error message. A web server can also accept and store resources sent from the user agent if configured to do so. The hardware used to run a Web server can vary according to the volume of requests that it needs to handle. At the low end of the range are embedded systems, such as a router that runs a small Web server as its configuration interface. A high-traffic Internet website might handle requests with hundreds of servers that run on racks of high-speed computers.

Message processing server(s) 818 include, but are not limited to, process messages between subscription-connected micro-platform topic nodes and process automated messages evoked by rules. Validation services 822 include, but are not limited to, security measures, such as encryption to ensure security of communications to/from or within the platform. Authentication server(s) 824 include, but are not limited to, user login script processing or other entity confirmation processes. Text Analyzer servers 826 include, but are not limited to, servers that recognize text, such as natural language processors (NLPs). The text analyzer servers may be used for topic searching, content processing, rules processing, etc. Email and Notification server(s) 828 include, but are not limited to, processing of email communication between micro-forum nodes, processing and communication of notifications, or for product assistance for new or existing users. Authorization services 830 include, but are not limited to, servers to process or enforce rules between micro-forum nodes.

Example databases will be described in greater detail below, but do not include all databases available to a micro-forum platform. One skilled in the art will appreciate that additional databases may be added to the micro-forum product architecture 800 without departing from the scope herein. A database is an organized collection and repository for data that may be stored and accessed electronically. Small databases can be stored on a file system, while large databases are hosted on computer clusters or cloud storage. The design of databases spans formal techniques and practical considerations, including data modeling, efficient data representation and storage, query languages, security and privacy of sensitive data, and distributed computing issues, including supporting concurrent access and fault tolerance. A database management system (DBMS) is the software that interacts with end users, Web services, application servers and the database itself to capture and analyze the data. The DBMS software additionally encompasses the core facilities provided to administer the database.

Environment configuration database 832 stores the micro-forum network configuration including, but are not limited to, data that captures listings and descriptions of connected micro-forum nodes, communication configurations, and topics nodes. User and Account database 834 includes, but is not limited to, a repository of user profile and account data. Message database 836 includes, but is not limited to, a repository of messages between micro-forum nodes, user messages, system messages, etc. Micro-forum and Subscriptions database 838 includes, but is not limited to, a repository of current micro-forums, subscribers, and subscriptions, previous micro-forums and subscribers, and historical data of the micro-forums and subscribers. Acceptance and transmission rules database 840 includes, but is not limited to, listing of micro-forums, accepted subscribers, and respective rule sets. Notification Queue database 842 includes, but is not limited to, a repository of notifications or alerts communicated in the micro-forum network or staged (queued) for future communications.

Figure 9:
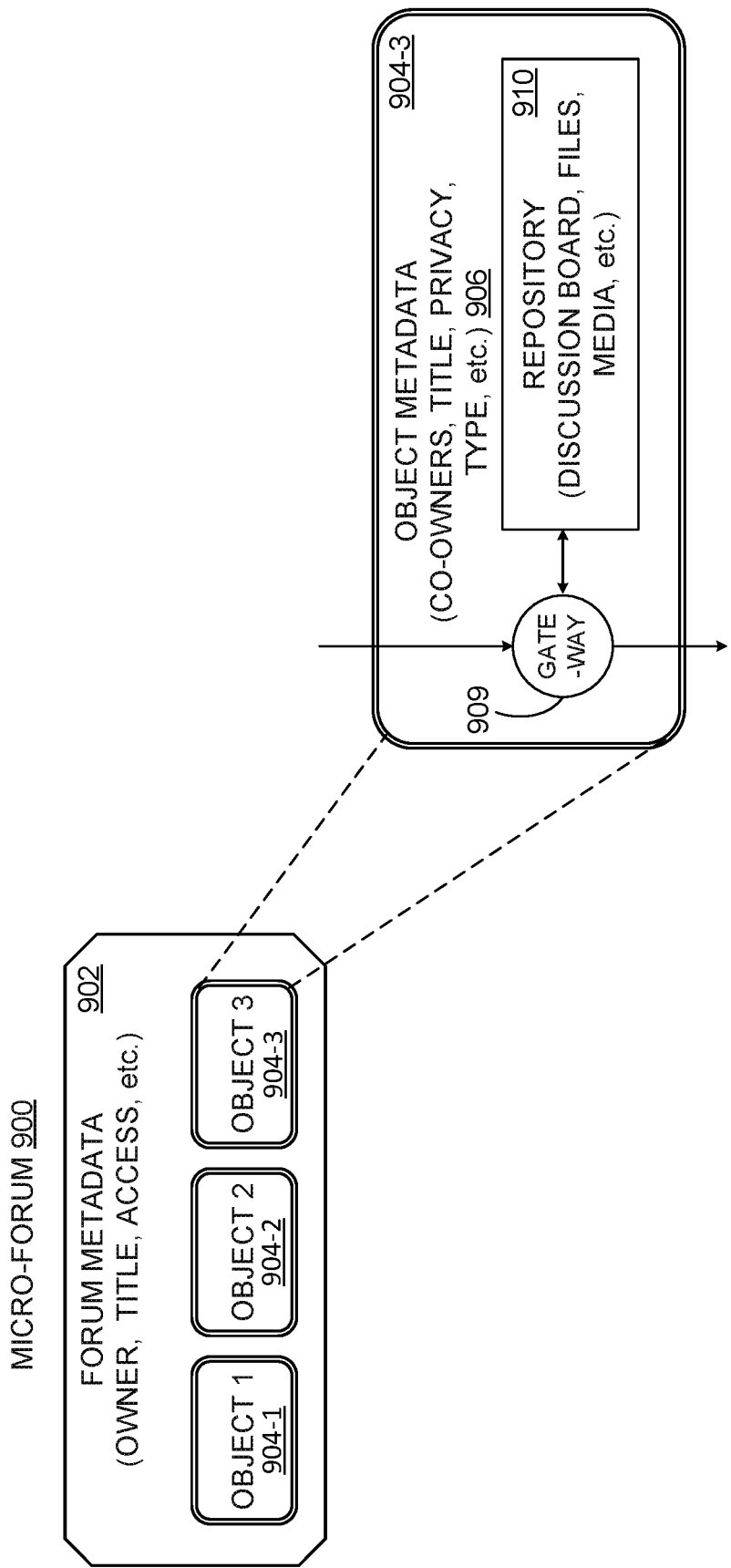
FIG. 9 is an example diagram of a micro-forum object, according to some embodiments.

FIG. 9 is a high-level view of a micro-forum 900, according to an embodiment. Micro-forum 900 can be performed by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the components may be in a different order than shown in FIG. 9, as will be understood by a person of ordinary skill in the art.

As shown, micro-forum 900 includes forum metadata 902 that describes the contents and/or context of the micro-forum, such as, but not limited to, security values (such, owner, access rights), display values (such as, title and owner name), default values for posts (such as, default visibility of posts, default category), etc. Micro-forum 900 may be configured with one or more objects 904 (objects 1-3). Objects contain the micro-forum children 122 and identifiable entities that have a set of attributes, behavior and state. An object breakout 904-3 of Object 3 illustrates that an object includes object metadata 906 that may include, but is not limited to, display information (such as, name, description, owner name, style, post template/type etc.), filtering and data-mining values (such as, micro-forum type, category, region, keywords, etc.), routing information (such as, subscriptions, rules, etc.), access control values (such as, privacy level, co-owners, white lists, black lists, etc.). The object may function as a node for the topic(s) 102 that functions as a gateway 909 to propagate content updates (e.g., messages) to other downstream subscribers. In addition, the object may function as a repository 910 for incoming messages, files, and media, etc. to be displayed as posts 116 on a discussion board to users. The micro-forum and object(s) will be described in greater detail in FIG. 10.

Figure 10:
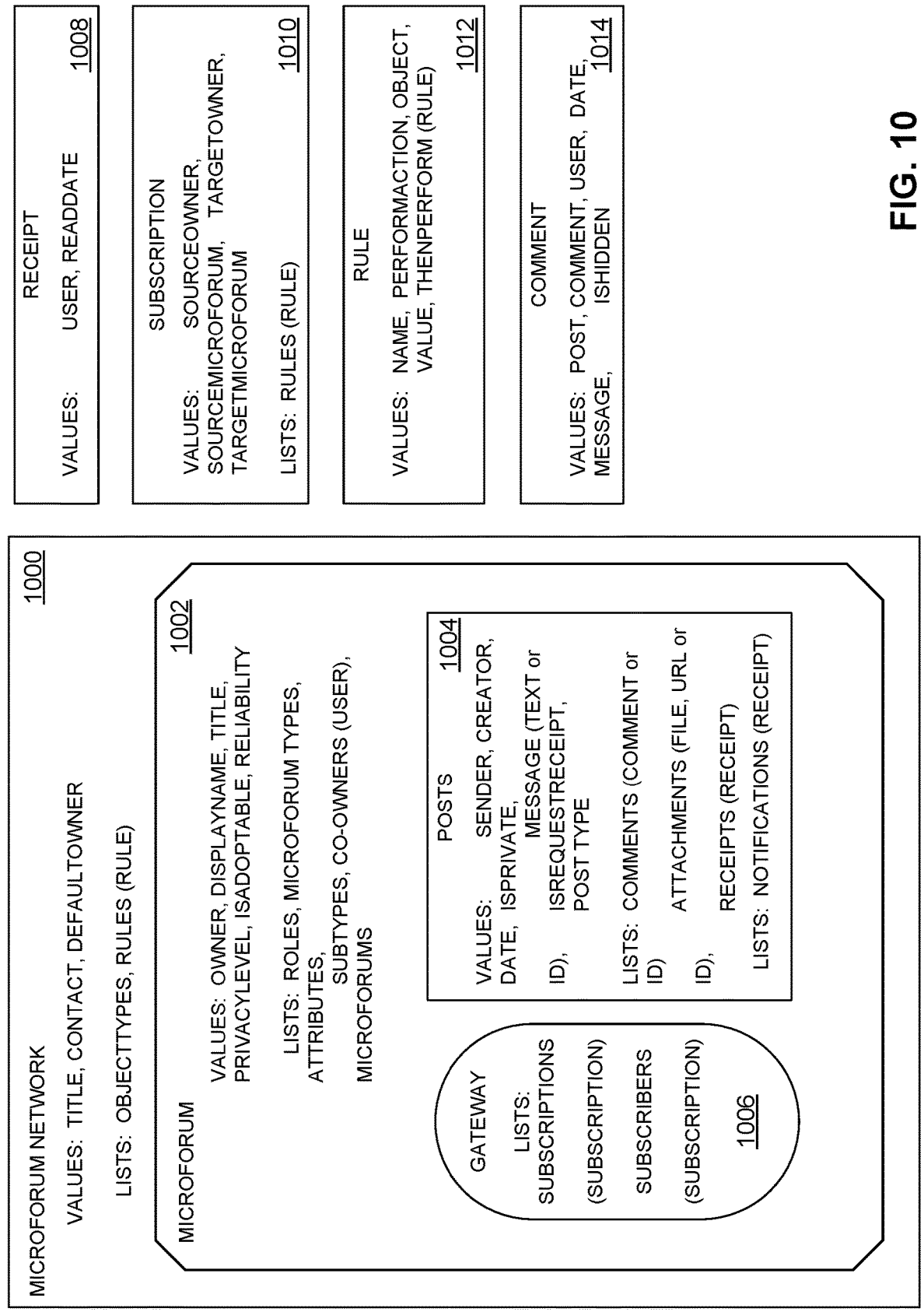
FIG. 10 is another example diagram of a micro-forum object, according to some embodiments.

FIG. 10 is a detailed view of a micro-forum object 1002 within a micro-forum network 1000, according to an embodiment. Micro-forum network 1000 can be performed by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the components may be in a different order than shown in FIG. 10, as will be understood by a person of ordinary skill in the art.

FIG. 10, showing the micro-forum network 1000 and micro-forum object 1002, illustrate components and data types stored that are not to be considered as an exhaustive list. As shown, micro-forum network 1000, micro-forum 1002, micro-forum posts/messages 1004 and gateway objects 1006 are nested and therefore provide data and security advantages. Each parent object defines attributed and configurations used to describe the child objects. For example, a micro-forum network 1000 may choose to define attributes of their micro-forum as "Software", "Server", and "Middleware". This will allow their users to create micro-forums like "Accounting is Software", "CUSTDB_API is Middleware", "SA101 is a Server". Dependencies can then be defined as "Accounting software depends on CUSTDB_API middleware which is hosted on SA101 server" and messages can be routed using "Posts from SA101 can be routed from CUSTDB_API to Accounting". This structure provides a platform for data-mining operations to answer questions like "How many applications are dependent on SA101 server?" or "How many users are impacted by the new middleware upgrade?" Micro-forums 1002 define the attributes available for gateways 1006, such as lists of subscriptions and the corresponding subscribers. While shown as a few subscriptions, each micro-forum 1002 may have an unlimited number of subscriptions/subscribers. Similarly, micro-forums 1002 define the attributes available for Posts/Messages 1004, such as, but not limited to, sender, creator, date, privacy, message text or id, receipt requests, and post type (e.g., template to apply on the message; types include, but not limited to, forum post, alert, survey, image grid, check list or document list, etc.). In addition, post/messages 1004 provide list attributes, such as, but not limited to, comments, attachments, receipts and notifications. These attributes provide a structure for users to instruct the gateway 1006 to use attributes to organize and direct incoming and outgoing messages. In a non-limiting example, a post from Server "SA101" with an attribute of "Red Alert—Server failure!" can provoke a different response than a simple "Routine maintenance successful" message.

In terms of security, this structure forces messages to pass through several checkpoints. For example, in some embodiments, each object stores relevant information regarding displaying, describing, securing, and verifying the data it contains, where the micro-forum network 1000 protects its terms and condition level' Similarly, the micro-forum 1002 protects its owner's interest and a post/message 1004 protects its sender's interest. In some embodiments, objects can control the visibility of a post/message, such as, the sender at that post/message level, the recipient at the micro-forum 1002 level, while the micro-forum network can prevent visibility at the network level if the post/message violates micro-forum network 1000 rules. FIG. 10 also illustrates a security component for the micro-forum 1002 object though gateway 1006, which uses subscriptions similar to a whitelist/blacklist to decide what posts/messages are posted or forwarded to its owner.

Additional object and associated parameters include, but are not limited to, receipts 1008 for messages received, subscriptions 1010, rules 1012 and comments 1014. Receipts 1008 include, but are not limited to, attributes of user and read date. Subscriptions 1010 include, but are not limited to, attributes of source owner, source micro-forum, target owner, target micro-forum and lists of rule(s). Rules 1012 include, but are not limited to, attributes of values of name, perform action, object, value, and then perform (rule). Comments 1014 include, but are not limited to, attributes of values of post, comment, user, date message and hidden or not hidden.

Figure 11:
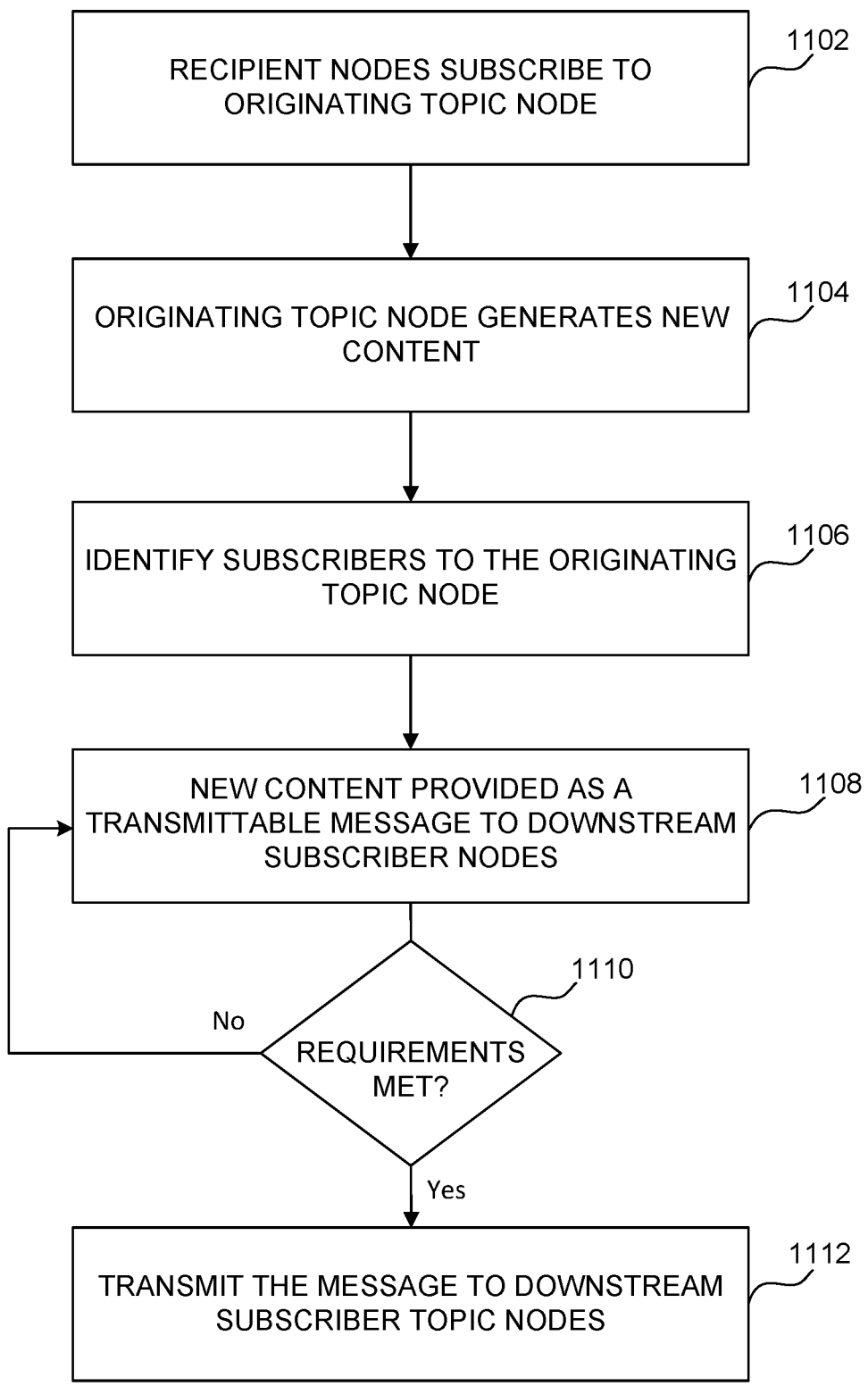
FIG. 11 is example diagram of a micro-forum process, according to some embodiments.

FIG. 11 is a flowchart for a method 1100 for a micro-forum topic node, according to an embodiment. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art.

Method 1100 shall be described with reference to FIG. 11. However, method 1100 is not limited to that example embodiment.

In 1102, a micro-forum node (recipient node) sends a subscription request message to a prospective topic node (originating node) requesting to become a subscriber. The message is sent to a message service which validates the requestor's credentials. Based on rules of the prospective topic node, the micro-forum node may be accepted as a subscriber.

In 1104, the prospective topic node generates (e.g., posts) updated or modified content within their topic node. For example, an owner of the micro-forum posts new content to the topic node.

In 1106, the topic node micro-forum identifies all subscribers to the topic node and for each identified subscriber, checks the transmission requirements for the sender node toward the specific recipient node (for example, is this recipient blocked) and acceptance requirements for the recipient node.

In 1108, the prospective topic node provides the new content as a transmittable message to downstream subscribers. The message is checked against rules of the micro-forum by a message service to pass prerequisite requirements.

In 1110, the message service sends the message to a message processing server. The message processing server checks to see if the message meets the requirements of the enterprise network, for example, quotas, terms of service, message sizes, or message transmission speeds, etc. The message service also determines, based on acceptance rules of the micro-forum nodes subscribing to the topic node how the message should be handled when received, for example, should the message be hidden, private, blocked, redirected or replaced.

In 1112, if both the sender node and recipient node agree to transmit the message, a copy of the message is added to the recipient nodes message list and a notification is sent to the recipient. If the recipient node also has subscribers to their topic node that receives the message, a new request is sent to the message processing server for a new copy of the message to be transmitted downstream to its subscribers. In some embodiments, post-processing is performed, such as, updating of quotas, audit trails, etc.

Features:

The various embodiments described provide an improvement to the computer system itself by. Unique features of the disclosed technology describing a micro-forum network include, but are not limited to:

The micro-forum network is non-hierarchical. Each micro-forum and owner can be a content originator or subscriber in the network.

Forum topics are dynamic and complex structures containing multiple topic related content and data, such as topic page, archival data, file and attachments lists.

Messages travel from forum topic node to forum topic node. This allows messages to stay "on topic" and relevant as they pass through the network.

A message may take unique and multiple routes between sender and recipient nodes. Any successful routes will deliver the message to the recipient. If a message is not successfully delivered, recipients and others can still access the message through a micro-forum topics page, search requests, notifications, and advertisement of topics or suggestions.

Recipient controls the whether a message reaches its destination.

Topics are determined by individual users who personalize their forum to meet their needs, maximizing their comfort level with their space and promoting content creation Topic-based, allowing for easy retrieval Content is maintained, scrubbed, and organized by individual owners, minimizing the stress and need for oversight Topic-based messages are a targeted broadcast to subscribers and stay correlated If there are inaccuracies in the topic correlation or unwanted content, users have the power to make corrections in real-time because they own their personal space No personal data required to deliver targeted messages Administrative users control validation and settings for the network. As micro-forums are private spaces controlled by their respective owners, maintenance is the responsibility of the users who best know and understand the topic The micro-forum network builds a structure between forum topics which may be mined for dependencies, exploration opportunities and change impact (e.g., discovering hidden dependencies and relationships), not owner or user data or histories.

Figure 12:
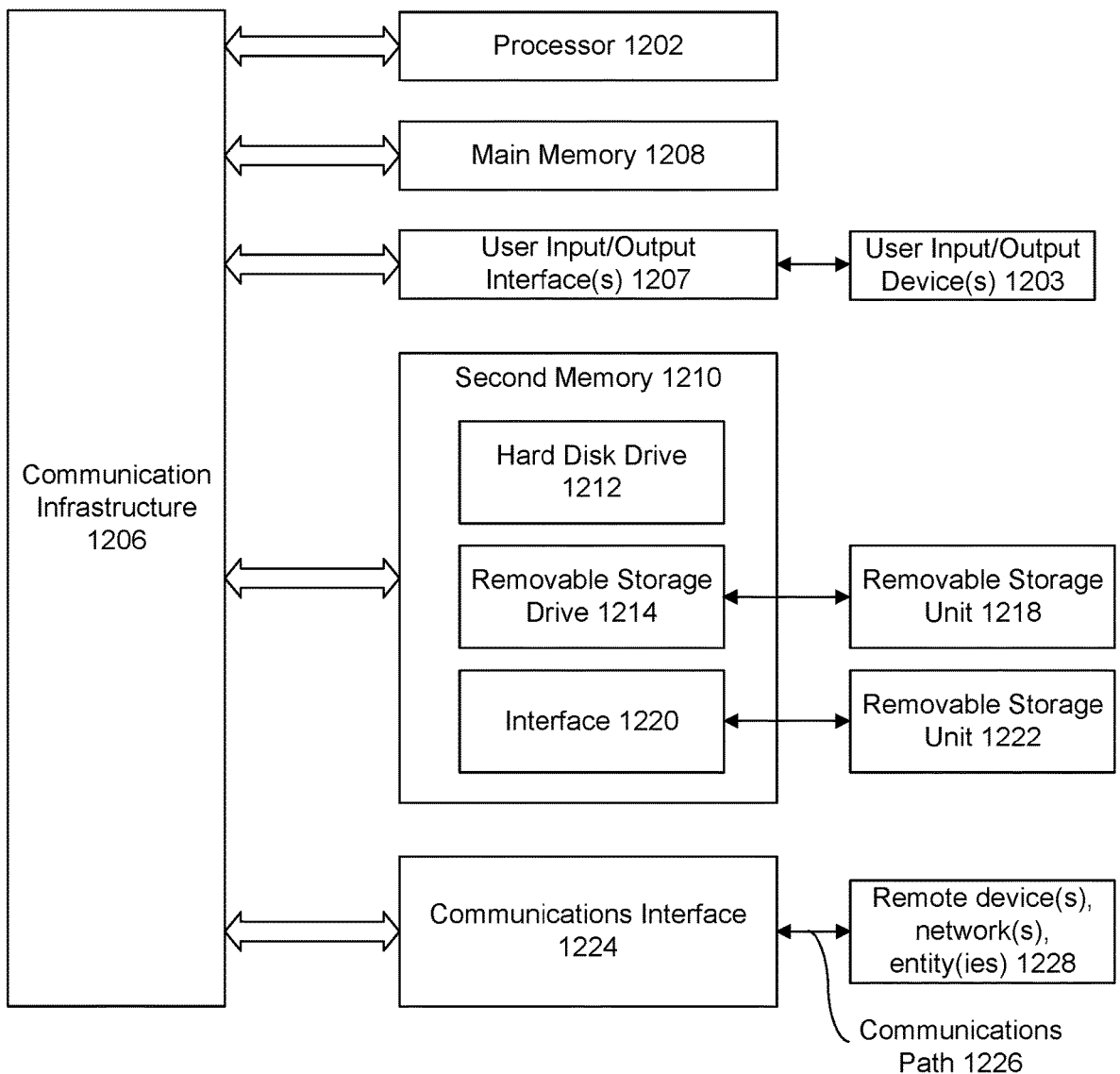
FIG. 12 is an example computer system useful for implementing various embodiments.

Various embodiments can be implemented, for example, using one or more computer systems, such as computer system 1200 shown in FIG. 12. Computer system 1200 can be used, for example, to implement method 1000 of FIG. 10 or any other methods or processes described herein. Computer system 1200 can be any computer capable of performing the functions described herein and may be instantiated locally, remotely or be part of a user's computing device(s). In addition, the computer system may include a single computing device, multiple interconnected computer devices or be part of a cloud processing architecture.

Computer system 1200 can be any well-known computer capable of performing the functions, steps, operations, methods, etc., described herein.

Computer system 1200 includes one or more processors (also called central processing units, or CPUs), such as a processor 12012. Processor 12012 is connected to a communication infrastructure or bus 1206.

One or more processors 1202 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1207.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device 1214. Removable storage drive 1214 may be a floppy disk drive, a magnetic tape drive, a compact disk drive, an optical storage device, tape backup device, a cloud drive and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but each embodiment need not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    receiving, by a computer system, a request message to subscribe to an originating node of a first enterprise micro-forum, wherein the first enterprise micro-forum is an organization owned construct operative within an enterprise micro-forum network comprising a plurality of enterprise micro-forums and wherein the originating node is configured with a first topic, and wherein the first micro-forum is configured with one or more rules to at least process the request message to subscribe;
    transmitting the request message to subscribe to a validation service to validate credentials of a recipient node;
    receiving, by the computer system, a topic message to be transmitted to the recipient node within a second enterprise micro-forum operative within the enterprise micro-forum network, wherein the recipient node comprises a subscriber based on an acceptance of the request message to subscribe, and wherein the topic message comprises modified content from the first topic;
    receiving, by the computer system and based on the one or more rules, transmission parameters for the originating node to transmit the topic message to the recipient node of the subscriber, wherein the recipient node includes a second topic;
    receiving, by the computer system, acceptance parameters for the recipient node to receive the transmitted topic message;
    transmitting, by the computer system and based on a match of the transmission parameters and the acceptance parameters, the topic message, wherein the topic message is to be retained in the second topic of the recipient node; and
    transmitting, by the computer system, a notification of the topic message sent to the recipient node.

2. The method of claim 1, further comprising transmitting the request message to a message service to determine if the request message meets requirements of the enterprise micro-forum network.

3. The method of claim 2, wherein the requirements of the enterprise micro-forum network comprise any of: quotas, terms of service, message sizes, or message transmission speeds.

4. The method of claim 1, wherein the acceptance parameters for the recipient node comprise handling the topic message within the recipient node based on any of: adherence to recipient node rules, previous historical interactions with one or more of the enterprise micro-forums, or message status.

5. The method of claim 4, wherein the message status comprises any of: hidden, private, blocked, redirected, ignored, or replaced.

6. The method of claim 1, further comprising identifying additional subscribers of the originating node of the first enterprise micro-forum and transmitting the topic message to each of the identified additional subscribers.

7. The method of claim 1, further comprising identifying subscribers to the recipient node of the second enterprise micro-forum and transmitting the topic message to each of the identified subscribers.

8. The method of claim 1, wherein acceptance requirements for the recipient node comprise any of: message is blocked, message is a duplicate, or filter parameters.

9. The method of claim 1, wherein the organization owned construct includes any of: a company, a division, a department, an executive, a manager, a member, a planner, an information technology (IT) staff, an employee, a contractor, a program, a project, a product, a scheduling assistant, an application, an event, a database, or a data stream.

10. The method of claim 1, wherein the first topic and the second topic are the same or similar based on any of: title, topic description, topic keywords, or rules of the recipient node.

11. The method of claim 1, wherein the topic message comprises any of: company financials, benefit programs, training content, an employee handbook, health policies and procedures, visitor data, employee reviews, company social activities and events, links to additional content, executable software code, new applications, software or hardware updates, or notifications associated with the software or hardware updates.

12. A system, comprising:
    a memory; and
    at least one processor coupled to the memory and configured to:
        receive a request message to subscribe to an originating node of a first enterprise micro-forum, wherein the first enterprise micro-forum is an organization owned construct operative within an enterprise micro-forum network comprising a plurality of enterprise micro-forums and wherein the originating node is configured with a first topic, and wherein the first micro-forum is configured with one or more rules to at least process the request message to subscribe;
        transmit the request message to subscribe to a validation service to validate credentials of a recipient node;
        receive a topic message to be transmitted to the recipient node within a second enterprise micro-forum operative within the enterprise micro-forum network, wherein the recipient node comprises a subscriber based on an acceptance of the request message to subscribe, and wherein the topic message comprises modified content from the first topic;
        receive, based on the one or more rules, transmission parameters for the originating node to transmit the topic message to the recipient node of the subscriber, wherein the recipient node includes a second topic;
        receive acceptance parameters for the recipient node to receive the transmitted topic message;
        transmit, based on a match of the transmission parameters and the acceptance parameters, the topic message, wherein the topic message is to be retained in the second topic of the recipient node; and transmit a notification of the topic message sent to the recipient node.

13. The system of claim 12, wherein the recipient node serves as a gateway for subsequent transmission of the topic message to downstream subscriber nodes of the recipient node.

14. The system of claim 12, the at least one processor further configured to: direct handling of the topic message within the recipient node based on the acceptance parameters for the recipient node comprising any of: adherence to recipient node rules, previous historical interactions with one or more of the enterprise micro-forums, or message status.

15. The system of claim 12, the at least one processor further configured to: identify additional subscribers to the originating node of the first enterprise micro-forum and transmit the topic message to a node of the identified additional subscribers.

16. The system of claim 12, the at least one processor further configured to: identify subscribers to the recipient node of the second enterprise micro-forum and transmit a copy of the topic message for each of the identified subscribers.

17. The system of claim 12, wherein a similarity of the first topic and the second topic is determined based on any of: title, topic description, topic keywords, or rules of the recipient node.

18. A non-transitory computer-readable device having instructions stored thereon that, when executed by at least one computing device, cause the at least one computing device to perform operations comprising:

receiving a request message to subscribe to an originating node of a first enterprise micro-forum, wherein the first enterprise micro-forum is an organization owned construct operative within an enterprise micro-forum network comprising a plurality of enterprise micro-forums and wherein the originating node is configured with a first topic, and wherein the first micro-forum is configured with one or more rules to at least process the request message to subscribe;

transmitting the request message to subscribe to a validation service to validate credentials of a recipient node;

receiving a topic message to be transmitted to the recipient node within a second enterprise micro-forum operative within the enterprise micro-forum network, wherein the recipient node comprises a subscriber based on an acceptance of the request message to subscribe, and wherein the topic message comprises modified content from the first topic;

receiving, based on the one or more rules, transmission parameters for the originating node to transmit the topic message to the recipient node of the subscriber, wherein the recipient node includes a second topic;

receiving acceptance parameters for the recipient node to receive the transmitted topic message;

transmitting, based on a match of the transmission parameters and the acceptance parameters, the topic message, wherein the topic message is to be retained in the second topic of the recipient node; and transmitting a notification of the topic message sent to the recipient node.

19. The non-transitory computer-readable device of claim 18, wherein the operations are further configured to identify additional subscribers to the originating node of the first enterprise micro-forum and the second enterprise micro-forum and transmit the topic message to a node of the identified additional subscribers.

\* \* \* \* \*